ized under 35 (74) *Attorney, Agent, or Firm* — Birch, Stewart, Kolasch & Birch, LLP

(12) United States Patent
Sakaki

(10) Patent No.: US 8,416,498 B2
(45) Date of Patent: Apr. 9, 2013

(54) MASTER MODEL OF LENS ARRAY AND METHOD OF MANUFACTURING THE SAME

(75) Inventor: Takeshi Sakaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 289 days.

(21) Appl. No.: 12/883,904

(22) Filed: Sep. 16, 2010

(65) Prior Publication Data
US 2011/0063734 A1 Mar. 17, 2011

(30) Foreign Application Priority Data

Sep. 17, 2009 (JP) ................ P2009-215958
Sep. 17, 2009 (JP) ................ P2009-215961
May 24, 2010 (JP) ................ P2010-118286

(51) Int. Cl.
*G02B 27/10* (2006.01)
(52) U.S. Cl. ............................... 359/619
(58) Field of Classification Search .......... 359/619–621; 264/2.5
See application file for complete search history.

(56) References Cited

U.S. PATENT DOCUMENTS

2003/0025227 A1* 2/2003 Daniell ............... 264/2.5
2010/0181691 A1 7/2010 Yoshida

FOREIGN PATENT DOCUMENTS

WO WO 2008/153102 A1 12/2008

* cited by examiner

*Primary Examiner* — Joseph P Martinez
(74) *Attorney, Agent, or Firm* — Birch, Stewart, Kolasch & Birch, LLP

(57) ABSTRACT

A master model of a lens array and a method of manufacturing the same are provided, which can make it possible to manufacture the master model in a relatively short time with a simple construction of an apparatus. In a master model of a lens array on which a plurality of lens portions is arranged, a plurality of members corresponding to lenses having curved surfaces formed in the same shape as lens surfaces of the lens portions is arranged in the same lines as those of the plurality of lens portions in the lens array and is connected in a body.

10 Claims, 20 Drawing Sheets

MASTER MODEL OF LENS ARRAY AND METHOD OF MANUFACTURING THE SAME

CROSS-REFERENCE TO RELATED APPLICATION

This application is based upon and claims the benefit of priority from the prior Japanese Patent Application Nos. 2010-118286, filed on May 24, 2010, 2009-215958 filed on Sep. 17, 2009 and 2009-215961 filed on Sep. 17, 2009; the entire contents of which are incorporated herein by reference.

BACKGROUND OF THE INVENTION

1. Field of the Invention

The present invention relates to a master model of a lens array and a method of manufacturing the same.

2. Description of the Related Art

Recently, in the portable terminals of electronic appliances such as portable phones, PDAs (Personal Digital Assistant), or the like, small-sized and ultra-thin imaging units have been installed. These imaging units are generally provided with a solid-state imaging device such as a CCD (Charge Coupled Device) image sensor, a CMOS (Complementary Metal-Oxide Semiconductor) image sensor, or the like, and a lens for forming an image on a light sensing surface of the solid-state imaging device.

As portable terminals have become smaller and thinner and have been spread, the imaging unit installed therein has been required to become further miniaturized and thinner, along with the demands for increased productivity. For such requests, a method of mass-producing imaging units has been known, whereby a sensor array in which a plurality of solid-state imaging devices is arranged and a lens array in which a plurality of lens portions is arranged in the same manner are made to overlap each other, are combined into a single body and then the lens array and the sensor array are cut so that they include the lens portions and the solid-state imaging devices, respectively.

In manufacturing a lens array used for the above-described purpose, the following manufacturing method has been known (for example, see WO 2008/153102 corresponding to US-A-2010/0181691).

(1) Using a mold having a lens forming surface in an inverse shape of a predetermined lens surface, the shape of the lens forming surface of the mold is transferred to resin supplied onto one surface of a substrate, and then the resin is cured.

(2) By repeating the process of (1), a resin forming portion that has been formed in the shape of a lens surface is arranged on one surface of the substrate.

(3) A resin forming portion that has been formed in the shape of a lens surface is also arranged on the other surface of the substrate in the same manner to obtain a master model.

(4) An upper mold and a lower mold are obtained by accumulating metal such as Ni or the like on one surface and the other surface of the master model by an electroforming process.

(5) A photocurable resin material or a thermosetting resin material is supplied between the upper mold and the lower mold.

(6) By inserting the resin material between the upper mold and the lower mold and compressing the molds, the resin material is deformed to make along both molds.

(7) The resin material is cured by irradiating the resin material with light or heating the resin material.

According to the above-described method of manufacturing the lens array, curved surfaces formed in the shape of predetermined lens surfaces are arranged on one surface and the other surface of the master model, respectively. On the upper mold, a lens forming surface, which is in an inverse shape of the curved surface in the shape of the lens surface that is arranged on one surface of the master model, is arranged, and on the lower mold, a lens forming surface, which is in an inverse shape of the curved surface in the shape of the lens surface that is arranged on the other surface of the master model, is arranged. Also, lens portions are formed between the lens forming surfaces which are composed of a pair of the upper mold and the lower mold, and these lens portions are connected together by a substrate portion formed between the forming surfaces except for the lens forming surfaces of the upper mold and the lower mold. In the lens array used for the above-described purpose, for example, a wafer in the shape of a circular plate has a diameter of 6 inches, 8 inches, or 12 inches, as a whole, and for example, thousands of lens portions are arranged on the wafer. Hereinafter, such a lens array in particular is called a wafer-level lens array.

In manufacturing a master model of a lens array in the method of manufacturing a lens array, it is necessary to repeat the process of transferring the lens forming surfaces of molds to resin supplied onto one surface and the other surface of the substrate and curing the supplied resin for as many times as the number of lens portions arranged on the lens array. Particularly, in the case of a master model of a wafer-level lens array on which thousands of lenses are arranged, manufacturing the master model takes a very long time. Also, since resin is supplied to and formed on the substrate, a manufacturing apparatus becomes larger-scaled due to the employment of resin supply means, mold driving means, measures taken to prevent leakage of supplied resin, and the like.

SUMMARY OF THE INVENTION

In view of the above situation, it is desirable to provides a master model of a lens array and a method of manufacturing the same, which can make it possible to manufacture the master model in a relatively short time with a simple construction of an apparatus.

(1) According to an embodiment of the present invention, there is provided a master model that is an original of a mold for forming a lens array on which a plurality of lens portions is arranged, in which a plurality of members corresponding to lenses having curved surfaces formed in the same shape as lens surfaces of the lens portions is arranged in the same lines as those of the plurality of lens portions in the lens array and is connected in a body.

(2) According to another embodiment of the present invention, there is provided a method of manufacturing a master model that is an original of a mold for forming a lens array on which a plurality of lens portions is arranged, which includes the steps of forming a plurality of members corresponding to lenses having curved surfaces formed in the same shape as lens surfaces of the lens portions; arranging one or more of the plurality of members corresponding to the lenses in the same lines as those of the plurality of lens portions in the lens array; and connecting the plurality of arranged members corresponding to the lenses in a body.

According to the embodiments of the present invention, a plurality of members corresponding to lenses is arranged and connected, and thus the master model of the lens array can be manufactured in a relatively short time using an apparatus with a simpler construction in comparison to repeating of a process of transferring lens forming surfaces of molds to resin on the substrate and curing the resin.

DESCRIPTION OF THE PREFERRED EMBODIMENTS

Hereinafter, preferred embodiments of the invention will be described in detail.

Figure 1:
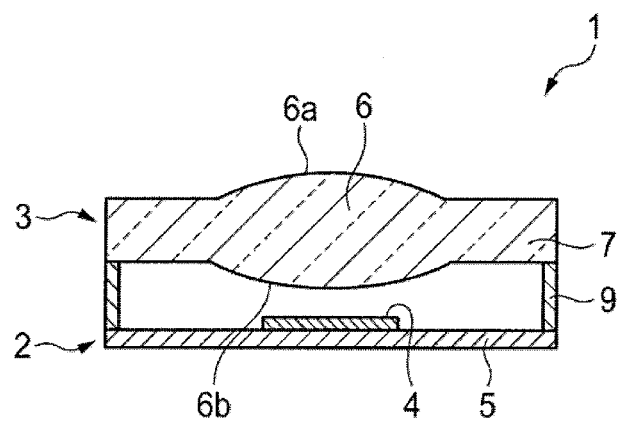
FIG. 1 is a view illustrating an example of an imaging unit according to an embodiment of the invention.

As illustrated in FIG. 1, an imaging unit 1 according to an embodiment of the invention includes a sensor module 2 and a lens module 3.

The sensor module 2 includes a solid-state imaging device 4 and a substrate portion 5. The substrate portion 5, for example, is formed of a semiconductor material such as silicon. The solid-state image device 4, for example, may be a CCD image sensor, a CMOS image sensor, or the like, and is configured by forming a light sensing region, an insulating layer, an electrode, a wire, and the like, on the substrate portion 5 through repetition of known processes of layer forming, photolithography, etching, impurity addition, and the like, with respect to the substrate portion 5.

The lens module 3 includes a lens portion 6 and a flange portion 7. The lens portion 6 has predetermined lens surfaces 6a and 6b formed on one surface and the other surface thereof. Although the both lens surfaces 6a and 6b are illustrated as convex-shaped spherical surfaces, diverse combinations of a convex-shaped spherical surface, a concave-shaped spherical surface, a non-spherical surface, and a plane may be adopted according to their uses. The flange portion 7 is projected from the circumference of the lens portion 6 to surround the circumference of the lens portion 6. The lens portion 6 and the flange portion 7 are formed of a transparent material in a body.

The lens module 3 is laminated on the sensor module 2 through spacers 9 between the flange portion 7 and the substrate portion 5 and is attached to the sensor module 2. The spacers 9 are formed with a thickness that corresponds to a predetermined distance between the substrate portion 5 of the sensor module 2 and the flange portion 7 of the lens module 3 so that the lens portion 6 of the lens module 3 forms an image on the light sensing surface of the solid-state imaging device 4 of the sensor module 2. The spacers 9 and the modules 2 and 3 are bonded, for example, using adhesives or the like.

The shape of the spacers 9, which are formed with a thickness that corresponds to a predetermined distance between the substrate portion 5 of the sensor module 2 and the flange portion 7 of the lens module 3, is not specifically limited, but it is preferable that the spacers 9 are frame-shaped members that surround the periphery of the solid-state imaging device 4 and separate the modules 2 and 3 from each other on the outside of the modules. According to this configuration, foreign substances such as dust are prevented from entering into the space between the modules 2 and 3 and being attached to the light sensing surface of the solid-state imaging device 4. Further, by forming the spacers 9 with a shading material, unnecessary light that is incident from the space between the modules 2 and 3 to the solid-state imaging device 4 can be intercepted.

In the illustrated example, one lens module 3 is attached to the sensor module 2. However, a plurality of lens modules 3 may be attached to the sensor module 2. In this case, the plurality of lens modules 3 is sequentially laminated through the intervention of spacers that are equivalent to the spacers 9, and is attached to the sensor module 2. Also, the lens surfaces 6a and 6b of the lens portion 6 may differ according to lens modules 3.

The imaging unit 1 as configured above, for example, is reflow-packaged on a circuit board of a portable terminal and so on. On a position of the circuit board where the imaging unit 1 is packaged, solder paste is pre-printed, and the imaging unit 1 is placed thereon. Then, a heating process, such as irradiation of infrared rays onto the circuit board including the imaging unit 1 or hot wind blowing thereto is performed. Through this heating process, the solder is melted and the imaging unit 1 is packaged on the circuit board.

The lens module 3 is obtained by cutting the lens array in which a plurality of lens portions 6 is one-dimensionally or two-dimensionally arranged so that the lens module includes the lens portion 6. Also, in the same manner, the sensor module 2 is obtained by cutting the lens array in which a plurality of solid-state imaging devices is one-dimensionally or two-dimensionally arranged so that the sensor module includes the solid-state imaging device. Hereinafter, the lens array for obtaining the lens modules 3 will be described in detail.

Figure 2:
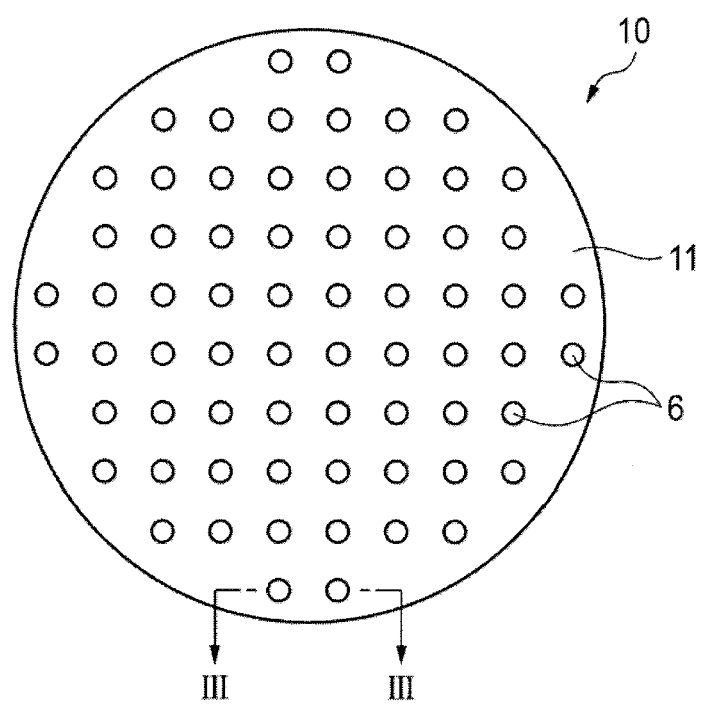
FIG. 2 is a view illustrating an example of a lens array according to an embodiment of the invention.
Figure 3:
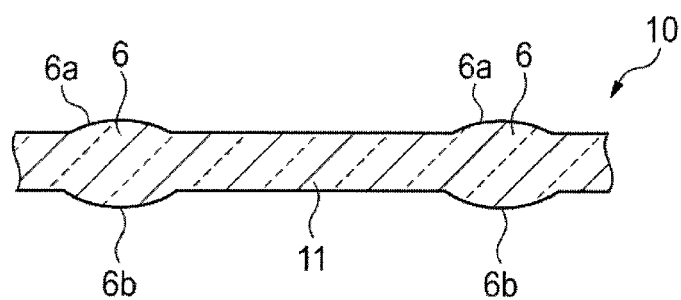
FIG. 3 is a view illustrating the lens array taken along line III-III of FIG. 2.

The lens array 10 as illustrated in FIGS. 2 and 3 includes a plurality of lens portions 6, and a substrate portion 11 that connects the lens portions 6 together. This lens array 10 is a wafer-level lens array which is in the form of a wafer of a predetermined size as a whole and on which the plurality of lens portions 6 is arranged. In the illustrated example, the plurality of lens portions 6 is two-dimensionally arranged. The lens portions 6 and the substrate portion 11 are formed of a transparent material in a body.

The lens module 3 (see FIG. 1) is obtained by cutting the substrate portion 11 between neighboring lens portions 6 in the wafer-level lens array 10. The cut portion of the substrate portion 11 which belongs to each lens portion 6 becomes the flange portion 7 of the lens module 3.

A master model of the wafer-level lens array 10 is manufactured and a mold is manufactured from the master model. Then, the wafer-level lens array 10 is manufactured using the mold. Hereinafter, a master model of the wafer-level lens array 10 and a method of manufacturing the same will be described.

Figure 4:
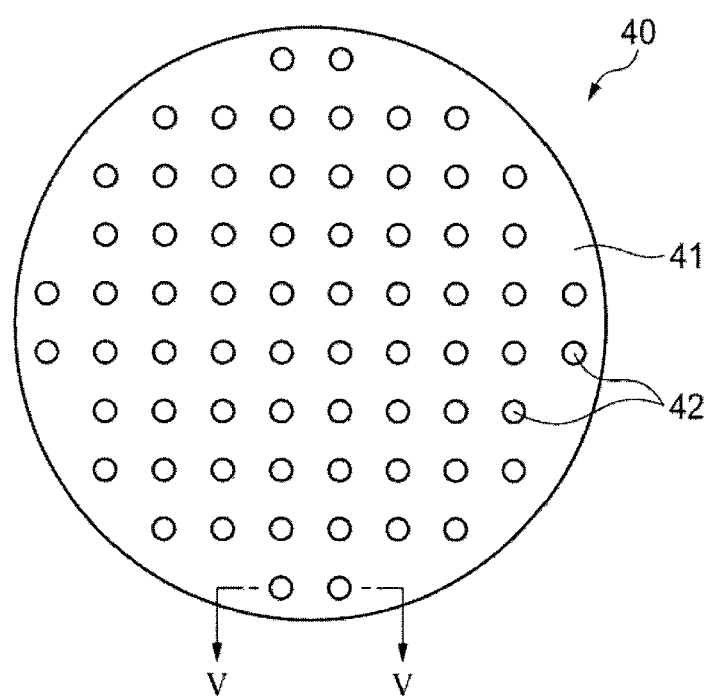
FIG. 4 is a view illustrating an example of a master model according to an embodiment of the invention.
Figure 5:
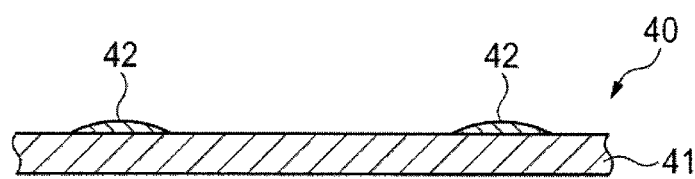
FIG. 5 is a view illustrating the master model taken along line V-V of FIG. 4.

A master model 40 as illustrated in FIGS. 4 and 5 includes a substrate 41 and a plurality of members 42 corresponding to lenses. The members 42 corresponding to lenses are arranged on the substrate 41 and are adhesively fixed to the substrate 41. In the illustrated example, the members 42 corresponding to lenses are two-dimensionally arranged to correspond to the arrangement of the plurality of lens portions 6 in the wafer-level lens array 10.

The substrate 41 is in the form of a wafer having the same size as that of the wafer-level lens array 10. The material of the substrate 41 is not specially limited, but, for example, may be glass or resin.

The member 42 corresponding to a lens has a curved surface which is in the same shape as that of a lens surface 6a on the surface side that is formed on the lens portion 6 of the wafer-level lens array 10, and the other surface of the member 42 is in a plane shape. The member 42 corresponding to a lens is formed by a glass press molding or a resin injection molding that is generally performed in manufacturing lenses for a digital camera.

Figure 6:
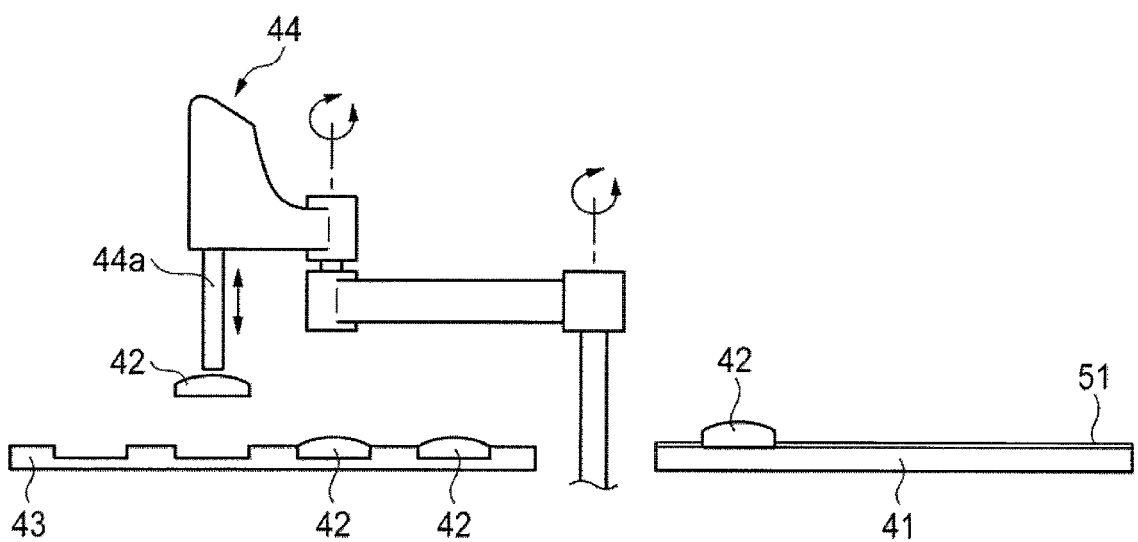
FIG. 6 is a view illustrating an example of a method of manufacturing a master model according to an embodiment of the invention.

FIG. 6 is a view illustrating a method of manufacturing a master model 40. A plurality of members 42 corresponding to lenses is pre-produced, and the produced members 42 corresponding to lenses are aligned and received in a lens holder 43. Also, on the substrate 41, adhesives 51 are spread. As the adhesives, for example, a photocurable or thermosetting resin material is used. Using an XY robot 44 that can precisely scan on the substrate 41, the members 42 corresponding to lenses received in the lens holder 43 are maintained, and the members 42 corresponding to lenses are extracted one by one from the lens holder 43 to be transported onto the substrate 41. Then, the members 42 corresponding to lenses are positioned to be arranged on predetermined positions of the substrate 41, and are closely adhered to the surface of the substrate 41 by pressing the members 42 corresponding to lenses onto the substrate 41. The holding of the members 42 corresponding to lenses by the XY robot 44 is performed using an absorption pad.

Figure 7:
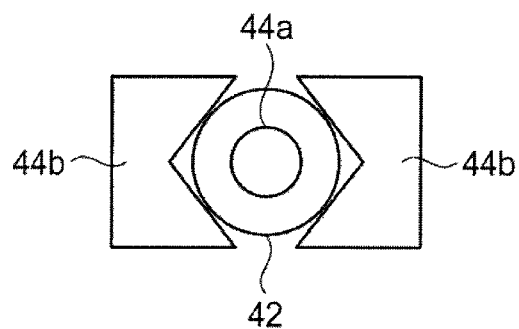
FIG. 7 is a view illustrating the details of the method of manufacturing a master model of FIG. 6.

As illustrated in FIG. 7, in the case of holding the members 42 corresponding to lenses by the XY robot 44, the member 42 corresponding to a lens is inserted between a pair of V-shaped blocks 44b that is driven to be opened or closed to perform the centering of support portion 44a of the XY robot 44 on the member 42 corresponding to a lens. In this case, in addition to the pair of V-shaped blocks 44b, the centering of the support portion 44a of the XY robot 44 on the member 42 corresponding to a lens may be performed using other appropriate guide means.

By repeating the above-described processes, the members 42 corresponding to lenses, the number of which is equal to the number of the plurality of lens portions 6 of the wafer-level lens array 10, are arranged on the substrate 41. In the case where UV curing resin is used as the adhesives 51, the members 42 corresponding to lenses are irradiated with UV rays, while in the case where thermosetting resin is used as the adhesives 51, the adhesives 51 are heated and then is cured to fix the members 42 corresponding to lenses to the substrate 41.

In the above-described processes, a master model 40 having the same shape as the surface of the wafer-level lens array 10 is manufactured. As described above, if the pre-produced members 42 corresponding to lenses are arranged on and fixed to the substrate 41, the master model 40 can be manufactured in a relatively short time with simple construction of the apparatus in comparison to the case where a process of transferring resin onto the lens forming surface of the mold and curing the resin on the substrate is repeated.

In the same manner, a master model on the other surface of the wafer-level lens array 10 is manufactured by arranging a plurality of members corresponding to lenses having curved surfaces in the same shape as the lens surface 6b on the other surface side, which are formed on the lens portions 6 of the wafer-level lens array 10, and fixing the members corresponding to lenses to the substrate. In this case, it is exemplified that the master model of the surface shape of the wafer-level lens array 10 and the master model of the other surface shape of the wafer-level lens array 10 are dividedly manufactured. However, the respective members corresponding to lenses may be fixed to one surface and the other surface of a shared substrate.

Also, in the above-described example, it is exemplified that the members 42 corresponding to lenses are extracted one by one from the lens holder 43 to be transported onto the substrate 41. However, a plurality of support portions 44a may be provided on the XY robot 44, and plural members 42 corresponding to lenses may be extracted from the lens holder 43 at a time to be arranged on the substrate 41. Further, if the position of one of the plurality of members 42 corresponding to lenses is determined on the substrate 41 in a state where the plurality of members 42 corresponding to lenses have been made in a connection state with each other by pitch in a line on the substrate 41, other members 42 corresponding to lenses are arranged in predetermined positions by themselves on the substrate 41, and thus the work efficiency is improved.

Hereinafter, a modified example of the master model 40 will be described.

Figure 8:
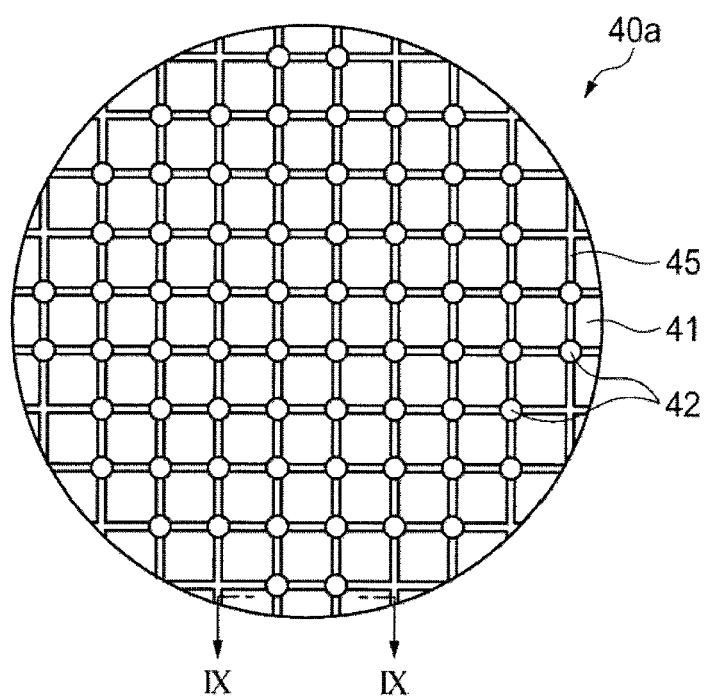
FIG. 8 is a plan view illustrating a modified example of the master model of FIG. 4.
Figure 9:
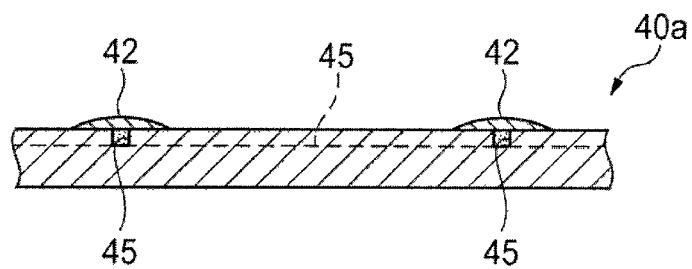
FIG. 9 is a view illustrating the master model taken along line IX-IX of FIG. 8.

A master model 40*a* as shown in FIGS. 8 and 9 includes a substrate 41 and a plurality of members 42 corresponding to lenses. Also, on the surface of the substrate 41, a plurality of concave portions 45 is formed. The concave portions 45 are installed on places where the members 42 corresponding to lenses are arranged. In an illustrated example, the concave portions 45 are connected to the neighboring concave portions 45 along rows or columns of the members 42 corresponding to lenses arranged in the form of a matrix. Since the concave portions 45 are connected along the rows or columns, they form lattice-shaped grooves. The concave portions 45 are filled with adhesives, and the members 42 corresponding to lenses are adhesively fixed to the substrate 41 by the adhesives filled into the concave portions 45. According to this, the surface of the substrate 41 is not covered with the adhesives, and the close contact of the members 42 corresponding to lenses with the surface of the substrate 41 is performed more accurately. Thus, the center axes of the members 42 corresponding to lenses (which correspond to optical axes of the lens portions 6) are prevented from falling down. Further, since a plurality of concave portions 45 is connected, the filling of adhesives into all the concave portions 45 is facilitated in comparison to a case where the concave portions 45 are independently provided. Further, since the concave portions 45 are connected along the rows or columns to form lattice-shaped grooves, the positions of the members 42 corresponding to lenses on the substrate 41 can be determined considering the lattice points as indexes.

Figure 10:
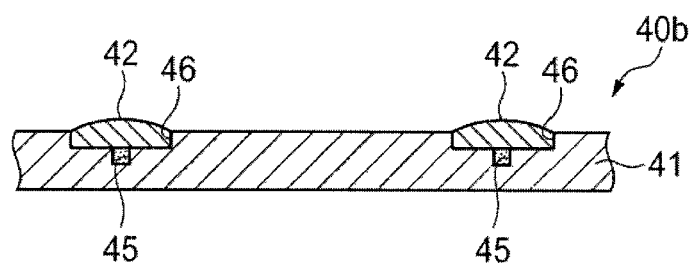
FIG. 10 is a view illustrating another modified example of the master model of FIG. 4.

A master model 40*b* as illustrated in FIG. 10 includes a substrate 41 and a plurality of members 42 corresponding to lenses. Also, on the surface of the substrate 41, a plurality of interlocking concave portions 46 is formed. The interlocking concave portions 46 are installed on places where the members 42 corresponding to lenses are arranged, and are formed with a size enough to accommodate the member 42 corresponding to a lens inserted therein. According to this, the position determination of the members 42 corresponding to lenses is facilitated, and the position determination accuracy can be improved. The interlocking concave portions 46, for example, may be formed by performing a sand blast process with respect to the substrate 41 using a mask that exposes the places that form the interlocking concave portions 46. In this case, in the illustrated example, the concave portions 45 into which the adhesives are filled are installed on the bottom surfaces of the interlocking concave portions 46.

Figure 11:
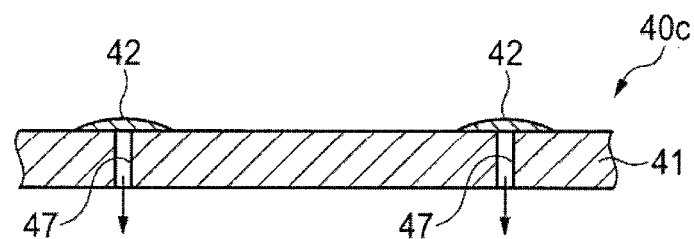
FIG. 11 is a view illustrating still another modified example of the master model of FIG. 4.

The master model 40*c* as illustrated in FIG. 11 includes a substrate 41 and a plurality of members 42 corresponding to lenses. In the substrate 41, a plurality of absorption holes 47 is formed. The absorption holes 47 penetrate the substrate 41 in the thickness direction of the substrate 41, and are open at places where the members 42 corresponding to lenses are arranged. After the members 42 corresponding to lenses are arranged on the substrate 41, the members 42 corresponding to lenses are absorbed to the substrate 41 by decompressing the absorption holes 47, and in this state, the members 42 corresponding to lenses are fixed to the substrate 41 by sealing the absorption holes 47. Accordingly, the surface of the substrate 41 is not covered with the adhesives, and the members 42 corresponding to lenses and the surface of the substrate 41 become in close contact with each other to prevent the center axes of the members 42 corresponding to lenses from falling down. In stead of fixing the members 42 corresponding to lenses to the substrate 41 by sealing the absorption holes 47, the members 42 corresponding to lenses may also be fixed by making the adhesives flow into the circumference of the members 42 corresponding to lenses and curing the adhesives in a state where the members 42 corresponding to lenses are absorbed to the substrate 41.

Figure 12:
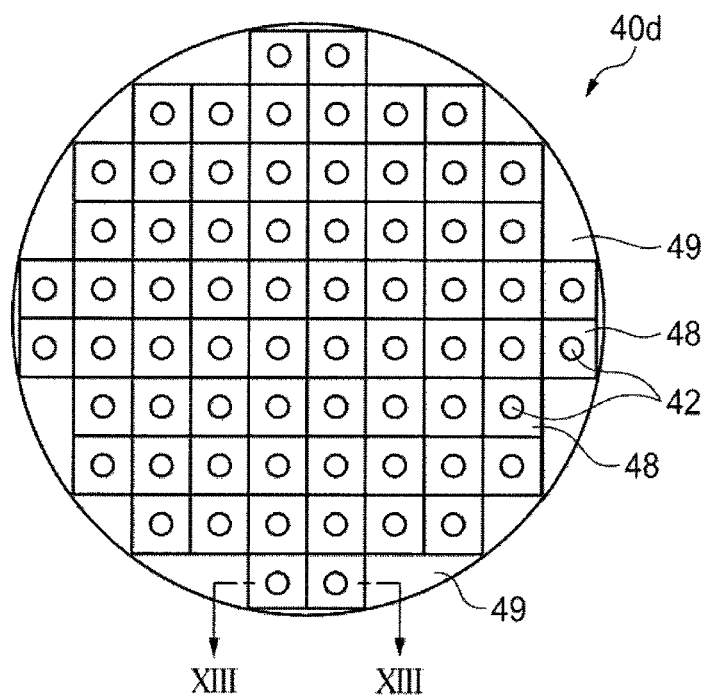
FIG. 12 is a view illustrating still another modified example of the master model of FIG. 4.
Figure 13:
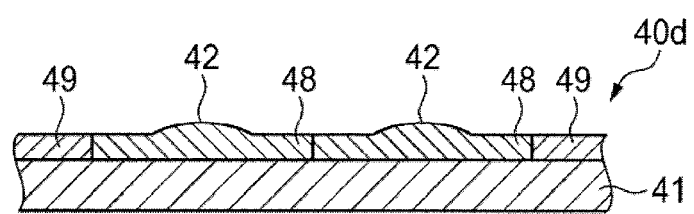
FIG. 13 is a view illustrating the master model taken along line XIII-XIII of FIG. 12.

The master model 40*d* as illustrated in FIGS. 12 and 13 includes a substrate 41 and a plurality of members 42 corresponding to lenses. Also, flange portions 48 are installed around the members 42 corresponding to lenses. The flange portions 48 are formed to be filled between the neighboring members 42 corresponding to lenses when the members 42 corresponding to lenses are arranged on the substrate 41, and in the illustrated example, the flange portions 48 are in the shape of tetragons as seen in the plan view. Accordingly, the position of one member 42 corresponding to a lens is determined on the substrate 41, and other members 42 corresponding to lenses are arranged on predetermined positions of the substrate 41 by contacting side surfaces of the flange portions 48, respectively, thereby improving the work efficiency. In this case, in regions which are not covered with the flange portions 48 of the member 42 in an outer periphery of the substrate 41, for example, putties 49 composed of the same material as that of the members 42 corresponding to lenses, such as glass, resin, or the like, are filled up to the same height as that of the neighboring flange portions 48.

According to the above-described master model 40 and its modified examples 40*a* to 40*d*, the plurality of members 42 corresponding to lenses is fixed to the substrate 41 and is connected together through the substrate 41. However, in the master model 40*d*, the members 42 corresponding to lenses can be connected together by connecting the respective flange portions 48 of the plurality of members 42 corresponding to lenses without passing through the substrate 41.

Next, a mold of the wafer-level lens array 10 will be described.

Figure 14:
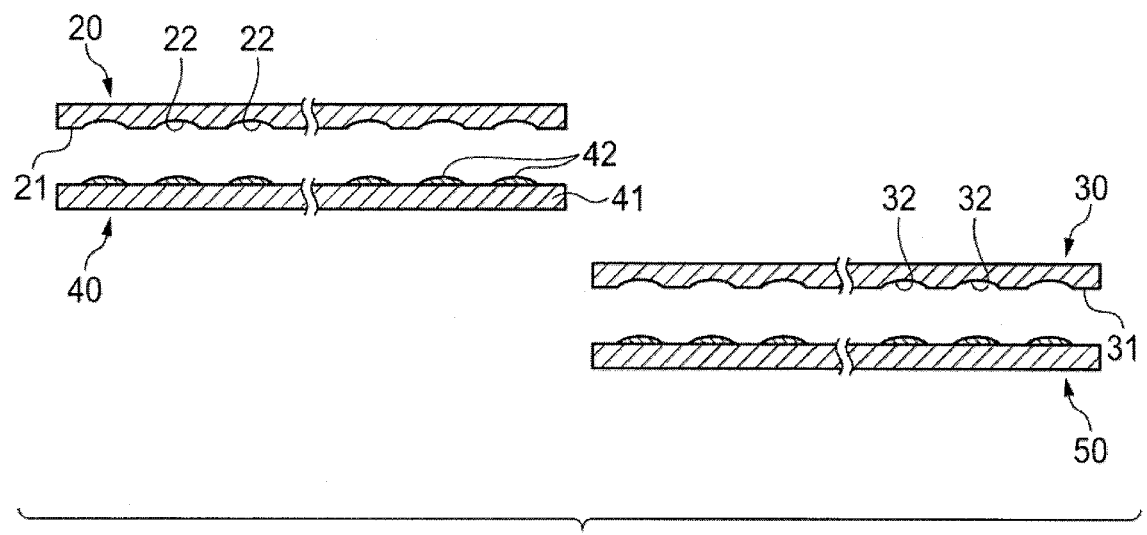
FIG. 14 is a view illustrating an example of a mold according to an embodiment of the invention.

An upper mold 20 as illustrated in FIG. 14 is a mold manufactured using the master model 40 regarding the shape of one surface of the wafer-level lens array 10. Also, a lower mold 30 is a mold manufactured using a master model 50 regarding the shape of the other surface of the wafer-level lens array 10.

A transfer surface 21 of the upper mold 20 is formed by transfer of the shape of the master model 40 thereto, and ultimately, is formed in an inverse shape of one surface shape of the wafer-level lens array 10. Accordingly, on the transfer surface 21, lens forming surfaces 22 are two-dimensionally arranged to correspond to the arrangement of the lens portions 6 of the wafer-level lens array 10. Also, the lens forming surfaces 22 are molded as concave-shaped spherical surfaces to correspond to the lens surfaces 6*a* which are convex-shaped spherical surfaces. A transfer surface 31 of the lower mold 30 is formed by transfer of the shape of the master model 50 thereto, and ultimately, is formed in an inverse shape of the other surface shape of the wafer-level lens array 10. Accordingly, on the transfer surface 31, lens forming surfaces 32 are two-dimensionally arranged to correspond to the arrangement of the lens portions 6 of the wafer-level lens array 10. Also, the lens forming surfaces 32 are molded as concave-shaped spherical surfaces to correspond to the lens surfaces 6*b* which are convex-shaped spherical surfaces. The upper mold 20 and the lower mold 30 are manufactured by an electroforming process.

Figure 15:
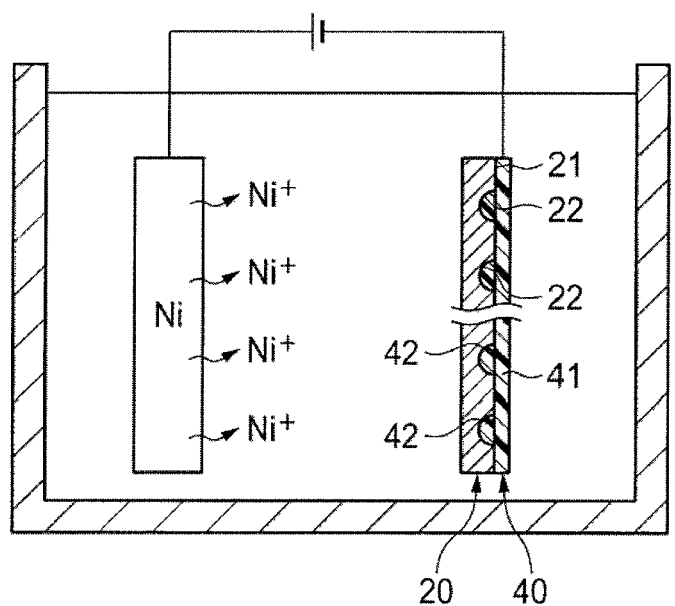
FIG. 15 is a view illustrating an example of a method of manufacturing the mold of FIG. 14.

As illustrated in FIG. 15, the manufacturing of the upper mold 20 by the electroforming process is as follows. First, a conductive layer is formed on the surface of the master model 40. Then, the master model 40 on which the conductive layer is formed is soaked in a nickel plating solution, and an electric field is formed in the solution in a state where the conductive layer serves as a negative electrode. Accordingly, nickel Ni is extracted and accumulated on the surface of the master model 40. The deposits of the nickel Ni become the upper mold 20 and the contact surface with the master model 40 becomes the transfer surface 21.

Next, with reference to FIGS. 16A to 16D, a method of manufacturing the wafer-level lens array 10 using the upper mold 20 and the lower mold 30 manufactured through the above-described processes will be described.

First, a molding material M is supplied onto the transfer surface 31 of the lower mold 30, and the molding material M is made to be spread over the transfer surface 31. In the case where the liquidity of the molding material M is relatively low, for example, the molding material M is preheated to improve the liquidity, and then is supplied onto the transfer surface 31 (see FIG. 16A).

As the molding material M, an energy-curable resin composition may be used. The energy-curable resin composition may be either a resin composition that is cured by heat or a resin composition that is cured by irradiation of active energy rays (for example, ultraviolet rays).

It is preferable that the molding material has an appropriate liquidity before it is cured from the viewpoint of the moldability such as the transfer aptitude of the mold shape and so on. Specifically, it is preferable that the molding material is liquid at ambient temperature and its viscosity is about 1000 to 50000 mPa·s.

On the other hand, it is preferable that the molding material is heat-resistant to the extent that it is not thermally deformed through a reflow process. From this viewpoint, the glass transition temperature of the cured material is preferably equal to or greater than 200° C., more preferably equal to or greater than 250° C., and particularly preferably equal to or greater than 300° C. In order to give such a high heat-resistance to the resin composition, it is necessary to restrict the mobility at molecular level, and effective means may be (1) means for heightening the crosslink density per unit volume, (2) means using a resin having rigid ring structure (for example, an aliphatic ring structure such as cyclohexane, norbornane, tetracyclododecane, and the like, an aromatic ring structure such as benzene, naphthalene, and the like, a cardo structure such as 9,9'-biphenylfluorene and the like, resins having a spiro structure such as spirobiindan and the like, specific examples may include resins described in Japanese Unexamined Patent Application Publication Nos. 9-137043, 10-67970, 2003-55316, 2007-334018, and 2007-238883), and (3) means for uniformly dispersing a high Tg material such as inorganic particles (for example, those described in Japanese Unexamined Patent Application Publication Nos. 5-209027 and 10-298265). It is preferable that these means may be used in combination, and may be controlled in the range that does not impair other characteristics such as fluidity, shrinkage ratio, refractive index, and the like.

From the viewpoint of the shape transfer accuracy, it is preferable that the material is a resin composition having a small volume contraction rate by curing reaction. It is preferable that the volume contraction rate of the resin composition is equal to or less than 10%, it is more preferable that the volume contraction rate is equal to or less than 5%, and it is furthermore preferable that the volume contraction rate is equal to or less than 3%. For example, the resin composition having a low volume contraction rate may be (1) resin compositions including a high molecular weight curing agent (prepolymer or the like) (for example, those disclosed in Japanese Unexamined Patent Application Publication Nos. 2001-19740, 2004-302293, and 2007-211247. The number-average molecular weight of the high molecular weight curing agent is preferably in the range of 200 to 100,000, more preferably in the range of 500 to 50,000, and particularly preferably in the range of 1,000 to 20,000. Also, the value calculated as the number-average molecular weight of the high molecular weight curing agent/the number of curing reactive groups is preferably in the range of 50 to 10,000, more preferably in the range of 100 to 5,000, and particularly preferably in the range of 200 to 3,000), (2) resin compositions including non-reactive material (organic/inorganic particles, non-reactive resins, and the like) (for example, those described in Japanese Unexamined Patent Application Publication Nos. 6-298883, 2001-247793, and 2006-225434), (3) resin compositions including a low-contraction crosslink reactive group (for example, a ring-opening polymerizable group (for example, an epoxy group (for example, those described in Japanese Unexamined Patent Application Publication No. 2004-210932), an oxetanyl group (for example, those described in Japanese Unexamined Patent Application Publication No. 8-134405), an episulphide group (for example, those described Japanese Unexamined Patent Application Publication No. 2002-105110), a ring type carbonate group (for example, those described in Japanese Unexamined Patent Application Publication No. 7-62065), an N/thiol curing group (for example, those described in Japanese Unexamined Patent Application Publication No. 2003-20334), and hydrosilylation curing group (for example, those described in Japanese Unexamined Patent Application Publication Nos. 2005-15666), (4) resin compositions including a rigid-skeleton resin (fluorine, adamantine, isophorone, and the like) (for example, those described in Japanese Unexamined Patent Application Publication No. 9-137043), (5) resin compositions which includes two kinds of monomers having different polymerizable groups and which forms an interpenetration network structure (so-called IPN structure) (for example, those described in Japanese Unexamined Patent Application Publication No. 2006-131868), and (6) resin compositions including an expansive material (for example, those described in Japanese Unexamined Patent Application Publication Nos. 2004-2719 and 2008-28417), or the like. In the present invention, the above-described resin compositions may be appropriately used. Also, from the viewpoint of the optimization of mechanical properties, it is preferable to use a plurality of cure shrinkage reduction means in combination (for example, a resin composition including prepolymer and particles containing ring-opening polymerizable group, and so on).

Also, it is preferable to use resin compositions having different Abbe values (equal to or more than two kinds (high-low)). In high Abbe-number side resin, the Abbe number (vd) is preferably equal to or larger than 50, more preferably equal to or larger than 55, and particularly preferably equal to or larger than 60. The refractive index (nd) is preferably equal to or larger than 1.52, more preferably equal to or larger than 1.55, and particularly preferably equal to or larger than 1.57. It is preferable that the above-described resin is a resin of an aliphatic group, and particularly, a resin having an aliphatic ring structure (for example, resins having a ring structure, such as such as cyclohexane, norbornane, adamantine, tricyclodecane, tetracyclododecane, and the like, and specifically, those disclosed in Japanese Unexamined Patent Application Publication Nos. 10-152551, 2002-212500, 2003-20344, 2004-210932, 2006-199790, 2007-2144, 2007-284650, 2008-105999, and the like).

In low Abbe-number side resin, it is preferable that the Abbe number (vd) is equal to or smaller than 30, it is more preferable that the Abbe number is equal to or smaller than 25, and it is furthermore preferable that the Abbe number is equal to or smaller than 20. The refractive index (nd) is preferably equal to or larger than 1.60, more preferably equal to or larger than 1.63, and particularly preferably equal to or larger than 1.65. The above-described resin is preferably a resin having an aromatic structure, for example, a resin including a structure, such as 9,9'-diarylfluorene, naphthalene, benzothiazole, benzotriazole, and the like (specific examples include those disclosed in Japanese Unexamined Patent Application Publication Nos. 60-38411, 10-67977, 2002-47335, 2003-238884, 2004-83855, 2005-325331, and 2007-238883, International Publication No. 2006/095610, U.S. Pat. No. 2,537,540, and the like).

Also, in the resin composition, it is preferable to disperse the inorganic particles over the matrix in order to heighten the refractive index or control the Abbe number. Examples of inorganic particles, for example, include oxide particles, sulfide particles, selenide particles, and telluride particles. In particular, examples of inorganic particles may include zirconium oxide, titanium oxide, zinc oxide, tin oxide, niobium oxide, cerium oxide, aluminum oxide, lanthanum oxide, yttrium oxide, oil zinc, and the like. In particular, with respect to the high Abbe number resin, it is preferable to disperse the particles of lanthanum oxide, aluminum oxide, zirconium oxide, and the like. With respect to the low Abbe number resin, it is preferable to disperse the particles such as titanium oxide, tin oxide, zirconium oxide, and the like. The inorganic particles may by used singly, or two or more kinds of inorganic particles may be used in combination. Also, a composite including a plurality of components may be used. Also, since the inorganic particles are used for diverse purposes such as reduction of photocatalytic activation, reduction of absorption rate, and the like, dissimilar metals may be doped, a surface layer may be coated with dissimilar metal oxide such as silica, alumina, and the like, or surface modification may be performed with dispersing agents having silane coupling agents, titanate coupling agents, organic acids (carboxylic acids, sulfonic acids, phosphoric acids, phosphonic acids, and the like), or organic acid group. The number-average particle size of the inorganic particles may be about 1 nm to 1000 nm. If the particle size is too small, the characteristics of the material may be changed, while if the particle size is too large, the effect of Rayleigh scattering becomes severe. Accordingly, the particle size is preferably 1 to 15 nm, more preferably 2 nm to 10 nm, and particularly preferably 3 nm to 7 nm. Also, it is preferable that the distribution of the particle size of inorganic particles becomes narrower. Although there are diverse methods of defining such monodispersed particles, the numerical regulation range as described in Japanese Unexamined Patent Application Publication No. 2006-160992 well suits the preferable particle diameter range. Here, the number-average first-order particle size can be measured by an X-ray diffraction (XRD) device or a transmission electronic microscope (TEM). The refractive index of the inorganic particles is preferably 1.90 to 3.00 at 22° C. in the wavelength of 589 nm, more preferably 1.90 to 2.70, and particularly preferably 2.0 to 2.70. From the viewpoint of transmission and high refractive index, the content of the inorganic particles in the resin is preferably equal to or larger than 5 w %, more preferably 10 to 70 w %, and particularly preferably 30 to 60 w %.

In order to uniformly disperse the particles on the resin composition, for example, it is preferable to disperse the particles by properly using dispersing agents including a functional group having a reactivity with a resin monomer that forms a matrix (for example, those described in examples or the like in Japanese Unexamined Patent Application Publication No. 2007-238884), a block copolymer composed of a hydrophobic segment and a hydrophilic segment (for example, those described in Japanese Unexamined Patent Application Publication No. 2007-211164), or a resin having a functional group that can form an optional chemical bond with inorganic particles at a polymer end or side chain (for example, those described in Japanese Unexamined Patent Application Publication Nos. 2007-238929 and 2007-238930).

Also, to the resin composition, additives such as a known release agents such as silicon series, fluorine series, long-chain alkyl group-containing compositions, and the like, or antioxidants such as hindered phenol and the like, may be appropriately added.

Also, if necessary, a curing catalyst or initiator may be combined with the resin composition. A specific example includes a compound that accelerates the curing reaction (radical polymerization or ion polymerization) by heat or activation energy rays, as described in Japanese Unexamined Patent Application Publication No. 2005-92099 Paragraph Number [0063] to [0070]. The addition amount of the curing reaction accelerating agents is not uniformly prescribed due to the kind of catalyst or initiator or a difference of the curing reaction regions, but in general, it is preferable that the addition amount is about 0.1 to 15 w % of the total amount of solids in the cure reactive resin composition, and it is more preferable that the addition amount is about 0.5 to 5 w %.

The resin composition may be produced by properly combining the above-described components. In this case, if other components are soluble in the liquefied low-molecule monomer (reactive diluents) and so on, it is not required to add a separate solvent. If the resin composition does not suit this case, the curable resin composition can be produced by dissolving the components using the solvent. As the solvent that can be used as the curable resin composition, there is no special limit, and it is sufficient if the composition is not deposited and can be uniformly dissolved or dispersed. Specifically, for example, the solvent may be ketone (for example, acetone, methyl ethyl ketone, methyl isobutyl ketone, and the like), esters (for example, ethyl acetate, butyl acetate, and the like), ethers (for example, tetrahydrofuran, 1,4-dioxane, and the like), alcohol (for example, methanol, ethanol, isopropyl alcohol, buthanol, ethylene glycol, and the like), aromatic hydrocarbons (for example, toluene, xylene, and the like), water, and the like. In the case where the curable composition includes a solvent, it is preferable to perform the mold shape transfer operation after drying the solvent by casting the composition on the substrate or mold.

Figure 16A:
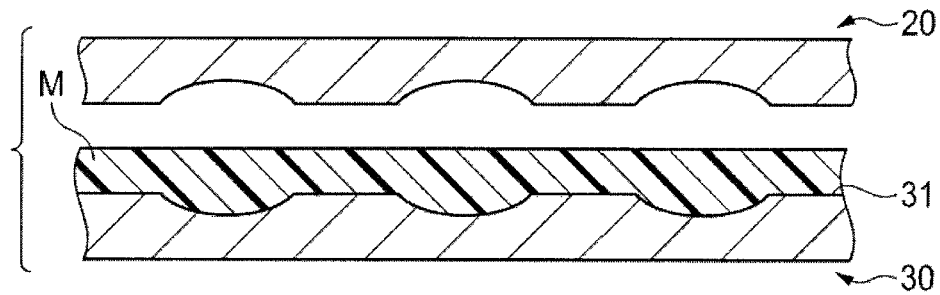
FIGS. 16A to 16D are views illustrating an example of a method of manufacturing a lens array using the mold of FIG. 14.
Figure 16B:
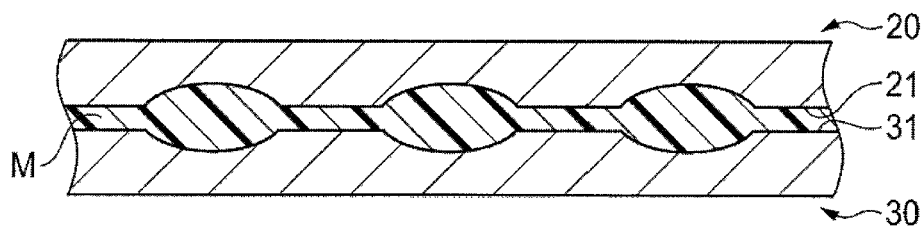
Figure 16C:
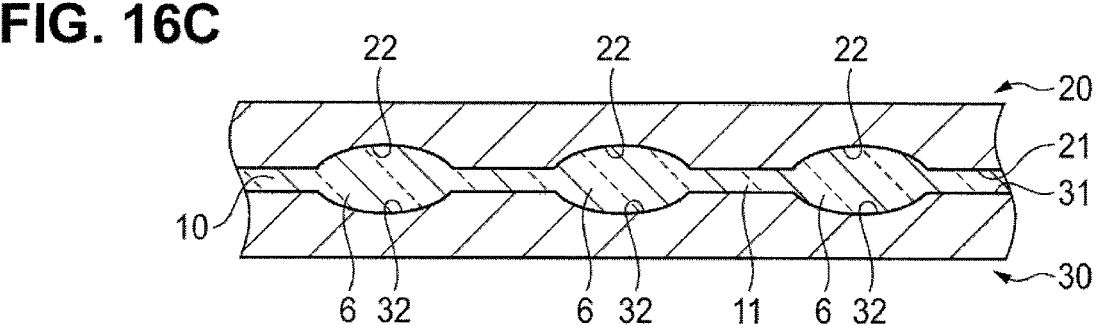

Thereafter, the upper mold 20 is lowered, the molding material M is inserted between the transfer surface 21 of the upper mold 20 and the transfer surface 31 of the lower mold 30, and then the upper and lower molds 20 and 30 are compressed to transform the molding material M so that the molding material M is molded on both the transfer surfaces 21 and 31 (see FIG. 16B).

Then, after the upper mold 20 is lowered down to the end, the molding material M, which is positioned between the transfer surface 21 of the upper mold 20 and the transfer surface 31 of the lower mold 30, is cured by giving curing energy to the molding material M through heating or irradiation of active energy rays, resulting in that the wafer-level lens array 10 is obtained. Lens portions 6 are formed between the lens forming surfaces 22 of the upper mold 20 and the lens forming surfaces 32 of the lower mold 30, which form a pair. Also, the substrate portion 11 is formed between the transfer surfaces 21 of the upper mold 20 and the transfer surfaces 31 of the lower mold 30 except for the lens forming surfaces 22 and 32 (see FIG. 16C).

Figure 16D:
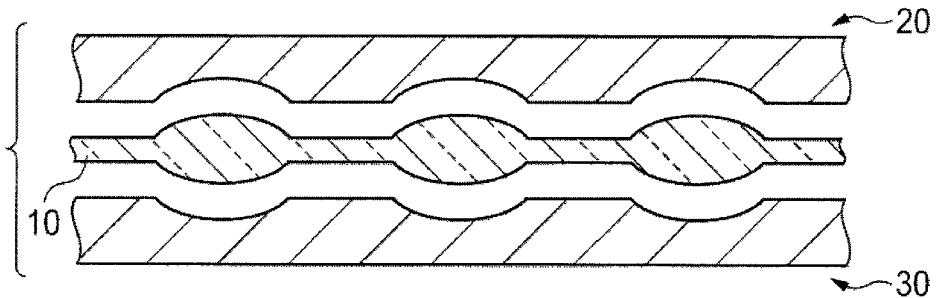

Then, the wafer-level lens array 10 is separated from the upper mold 20 and the lower mold 30 (see FIG. 16D).

In the method of manufacturing the wafer-level lens array 10 as described above, the master model 40 that is used in the manufacturing method is configured by arranging a plurality of members 42 corresponding to lenses on which curved surfaces that correspond to either of the lens surfaces 6a and 6b of one surface and the other surface of the lens portions 6 of the wafer-level lens array 10 are installed. Hereinafter, a master model that is configured by arranging a plurality of members corresponding to lenses, on which both the curved surfaces corresponding to the lens surfaces 6a of the lens portions 6 and the curved surfaces corresponding to the lens surfaces 6b are installed, will be described. In the following description of the invention, it is assumed that the lens surfaces 6a and 6b on one surface and the other surface of the lens portions 6 are convex-shaped spherical surfaces, concave-shaped spherical surfaces, or non-spherical surfaces, and have power in all.

Figure 17:
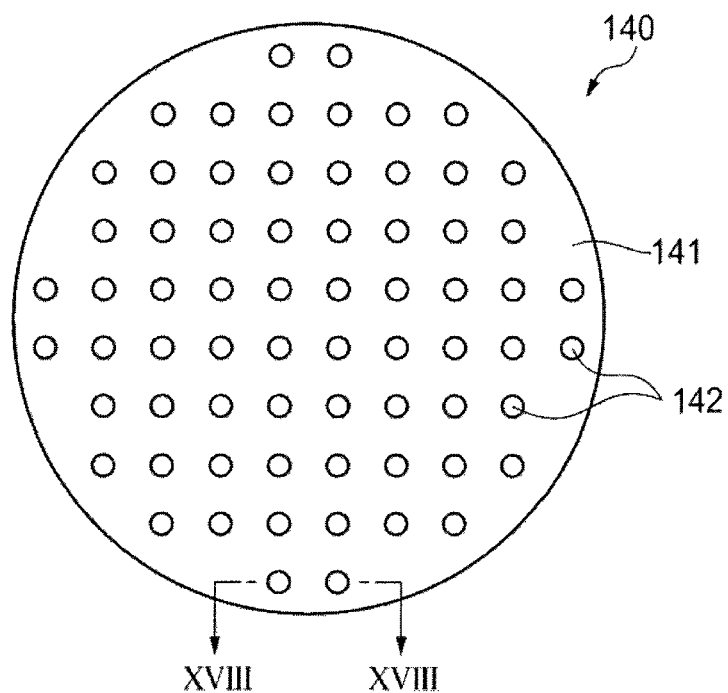
FIG. 17 is a view illustrating another example of a master model according to an embodiment of the invention.
Figure 18:
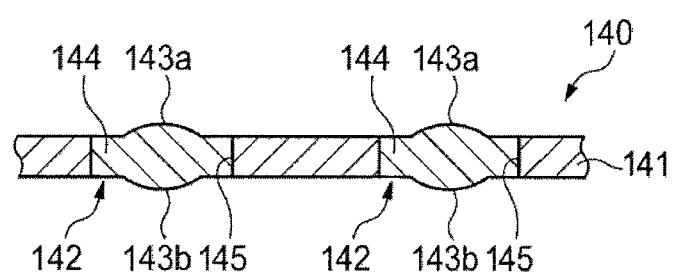
FIG. 18 is a view illustrating the master model taken along line XVIII-XVIII of FIG. 17.

A master model 140 as illustrated in FIGS. 17 and 18 includes a substrate 141 and a plurality of members 142 corresponding to lenses.

The members 142 corresponding to lenses have curved surfaces 143a and 143b formed on one surface and the other surface thereof, and a flange portions 144 including circumferences of portions inserted between the curved surfaces 143a and 143b, respectively. The curved surfaces 143a on one surface side are formed in the same shape of that of the lens surfaces 6a on one surface side of the lens portions 6 of the wafer-level lens array 10, and the curved surfaces 143b on the other surface side are formed in the same shape of that of the lens surfaces 6b on the other surface side of the lens portions 6 of the wafer-level lens array 10. The thickness of the portions inserted between the curved surfaces 143a and 143b is the same as the thickness of the lens portions 6 of the wafer-level lens array 10, and the thickness of the flange portions 144 is the same as the thickness of the substrate portion 11 of the wafer-level lens array 10.

The curved surfaces 143a and 143b are formed so that their center axes coincide with each other. The coaxiality that is permitted with respect to the center axes of the curved surfaces 143a and 143b is based on the coaxiality that is permitted with respect to the optical axes of the lens surfaces 6a and 6b on one surface and the other surface of the lens portions 6 of the lens module 3 in the imaging unit 1 (see FIG. 1), and for example, is typically 1 to 2 µm in the imaging unit mounted on a portable phone or the like. The members 142 corresponding to lenses that satisfy the above-described coaxiality may be formed, for example, by glass press molding or resin injection molding.

The substrate 141 is in the form of a wafer having the same size as that of the wafer-level lens array 10, and its thickness is the same as that of the substrate portion 11 of the wafer-level lens array 10. On the substrate 141, a plurality of through-holes 145, which penetrate the substrate 141 in the thickness direction d of the substrate 141 and have a size enough to accommodate the members 142 inserted into the through-holes, respectively, is formed. The through-holes 145 are arranged on the substrate 141 in the same lines as those of the lens portions 6 in the wafer-level lens array 10. The material of the substrate 141 is not specifically restricted, and for example, glass or resin is used as the material of the substrate 141.

Next, a method of manufacturing a master model 140 will be described.

Figure 19A:
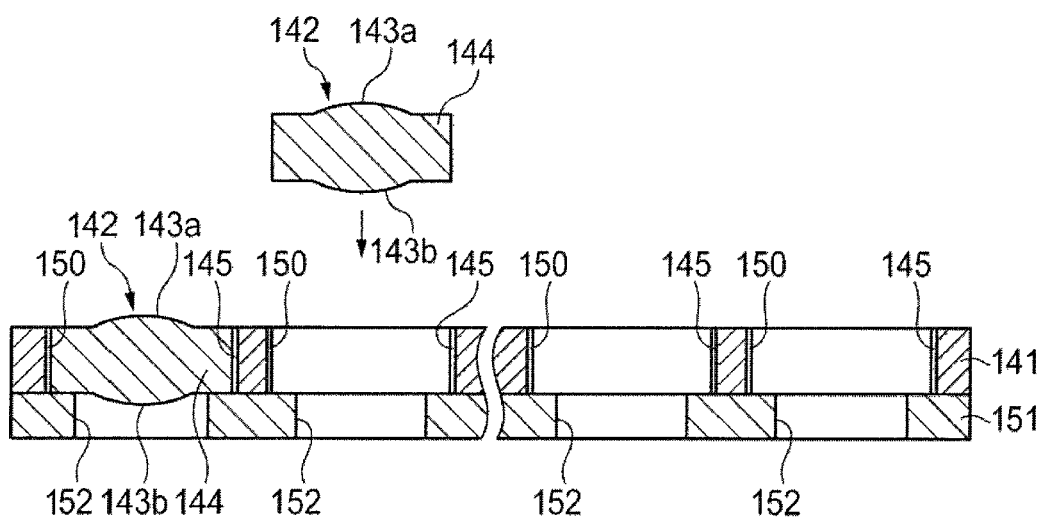
FIGS. 19A and 19B are views illustrating another example of a method of manufacturing a master model according to an embodiment of the invention.
Figure 19B:
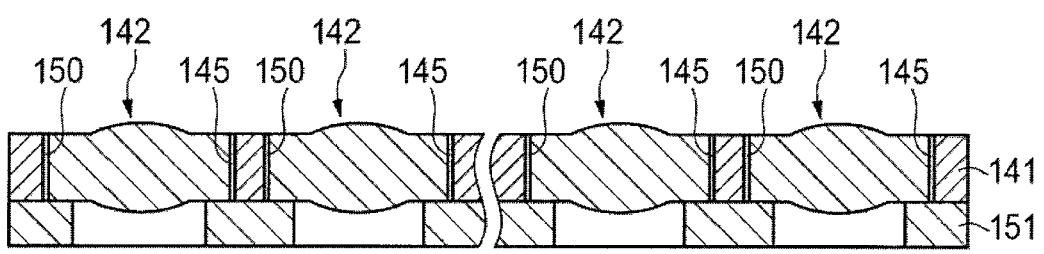

As illustrated in FIGS. 19A and 19B, in the inner periphery of the through-holes 145 of the substrate 141, adhesives 150 are spread. As the adhesives, for example, a photocurable resin material or a thermosetting resin material is used. On the other surface of the substrate 141, a fixture 151 is attached. In the fixture 151, a plurality of through-holes 152, which communicate with the through-holes 145 of the substrate 141, respectively, is formed. The through-hole 152 has a diameter that is larger than that of the curved surface 143b of one side of the members 142 corresponding to lenses, and is smaller than that of the flange portion 144. The members 142 corresponding to lenses are inserted into the through-holes 145 of the substrate 141, respectively. The fixture 151 exposes the curved surfaces 143b of the other surface of the member 142 inserted into the through-holes 145 of the substrate 141 through the through-holes 152, and supports the flange portions 144 of the members 142 corresponding to lenses on the circumferences of the through-holes 152 to make all the members 142 corresponding to lenses have the same height (see FIG. 19A).

By repeating the above-described process, the members 142 corresponding to lenses are inserted into all the through-holes 145 of the substrate 141. Thereafter, in the case of using the UV-curable resin as the adhesives 150, the UV-curable resin is irradiated with UV rays, while in the case of using the thermosetting resin as the adhesives 150, the thermosetting resin is heated to cure the adhesives 150, and thus the respective members 142 corresponding to lenses are fixed to the substrate 141. After the members 142 corresponding to lenses are fixed to the substrate 141 by adhering, the fixtures 151 are separated from the substrate 141 (see FIG. 19B).

As described above, the plurality of members 142 corresponding to lenses is arranged in the same lines as those of the plurality of lens portions 6 in the wafer-level lens array 10, and is connected together in a body by the substrate 141. Accordingly, the obtained master model 140 has the same shape as the wafer-level lens array 10.

As described above, a plurality of members 142 corresponding to lenses, which are formed on one surface and the other surface of the curved surfaces 143a and 143b that have the same shape as the lens surfaces 6a and 6b formed on one surface and the other surface of the lens units 6 of the wafer-level lens array 10, is arranged, and their curved surfaces 143a and 143b are arranged on one surface and the other surface of the master model 140. It is relatively facilitated to form the curved surfaces 143a and 143b on one surface and the other surface of the members 142 corresponding to lenses with their center axes coinciding with each other at high precision. Accordingly, the center axes of the curved surfaces 143a and 143b, which form a pair, coincide with each other easily and at high precision over the whole master model 140.

Next, a mold of a lens array manufactured using the master model 140 and the manufacturing method thereof will be described.

Figure 20:
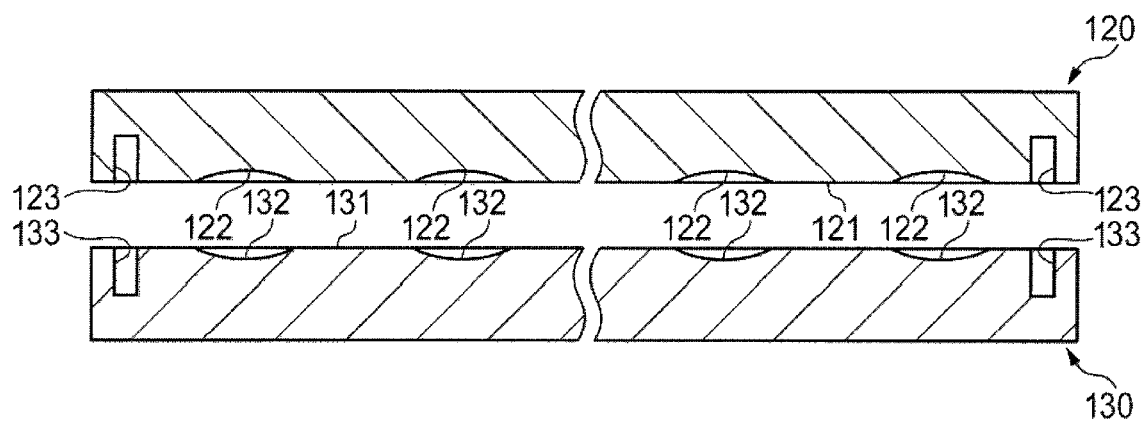
FIG. 20 is a view illustrating another example of a mold according to an embodiment of the invention.

The mold as illustrated in FIG. 20 includes an upper mold 120 and a lower mold 130.

The upper mold 120 has a transfer surface 121. The transfer surface 121 is formed through the transfer of the shape of one surface of the master model 140 to the transfer surface 121, and consequently, has an inverse shape of the shape of one surface of the wafer-level lens array 10. On the transfer surface 121, a plurality of lens forming surfaces 122 is formed in a matrix shape in the same lines as those of the curved surfaces 143a arranged on the surface side of the master model 140. The lens forming surfaces 122 are formed on the concave-shaped spherical surfaces corresponding to the curved surfaces 143a which are the convex-shaped spherical surfaces.

The lower mold 130 has a transfer surface 131. The transfer surface 131 is formed through the transfer of the shape of the other surface of the master model 140 to the transfer surface 131, and consequently, has an inverse shape of the shape of the other surface of the wafer-level lens array 10. On the transfer surface 131, a plurality of lens forming surfaces 132 is formed in a matrix shape in the same lines as those of the curved surfaces 143b arranged on the other surface side of the master model 140. The lens forming surfaces 132 are formed on the concave-shaped spherical surfaces corresponding to the curved surfaces 143b which are the convex-shaped spherical surfaces.

The upper mold 120 and the lower mold 130 are position determination portions that perform mutual position determination, and pin accommodation holes 123 and 133, which form pairs, are provided in a plurality of places of the upper mold 120 and the lower mold 130.

Figure 21:
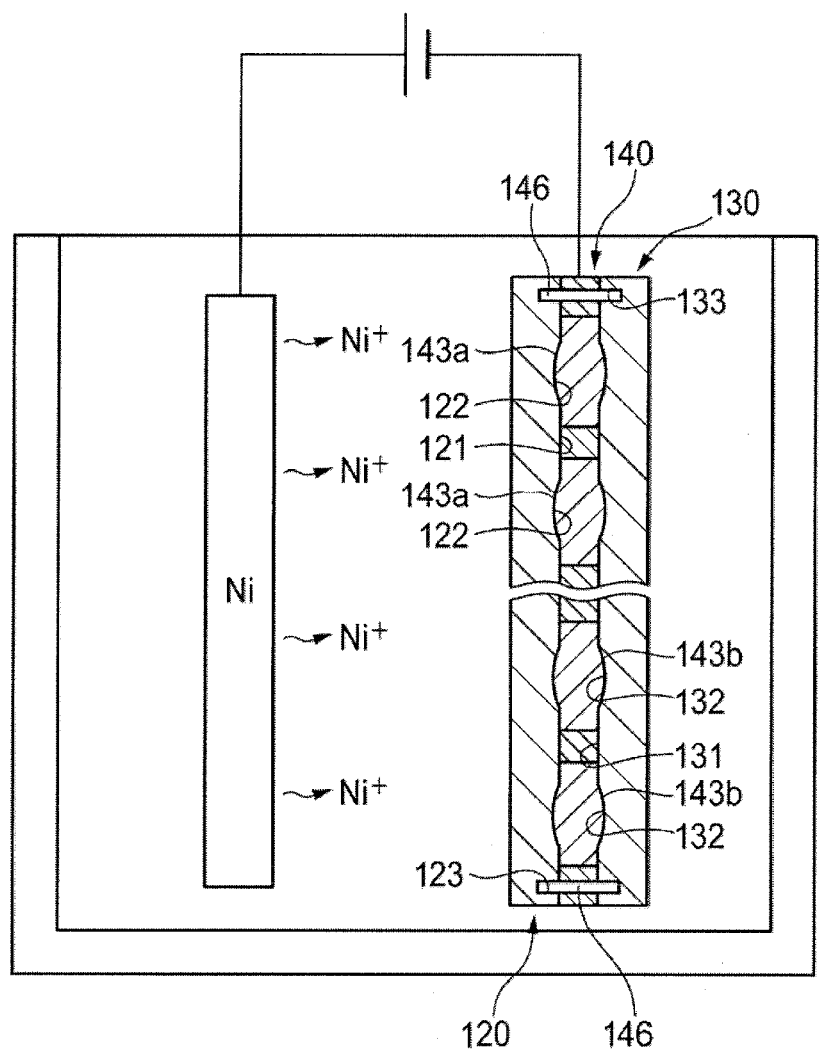
FIG. 21 is a view illustrating an example of a method of manufacturing the mold of FIG. 20.

As illustrated in FIG. 21, the upper mold 120 and the lower mold 130 can be manufactured by an electroforming method using the master model 140. First, pins 146 are installed to stand in a plurality of places of the master model 140. The pins 146 are arranged to penetrate the master model 140 in the thickness direction of the master model 140 so that they project to one surface side and the other surface side of the master model 140. Conductive layers are formed on one surface and the other surface of the master model 140.

Then, the master model 140 is soaked in a nickel plating solution, and an electric field is formed in the solution in a state where the conductive layer serves as a negative electrode. Accordingly, nickel Ni is extracted and accumulated on one surface and the other surface of the master model 140. The deposits on one surface of the master model 140 become the upper mold 120 and the deposits on the other surface of the master model 140 become the lower mold 130.

In the upper mold 120, the contact surface with the master model 140 becomes the transfer surface 121, and on the transfer surface 121, the lens forming surfaces 122 of an inverse shape of the curved surfaces 143a are arranged in the same lines as those of the curved surfaces 143a arranged on one surface side of the master model 140. Also, on the transfer surface 121, the pin accommodation holes 123, which are formed through the transfer of the shape of end portions of the pins 146 arranged to project to one surface side of the master model 140, are formed.

In the same manner, in the lower mold 130, the contact surface with the master model 140 becomes the transfer surface 131, and on the transfer surface 131, the lens forming surfaces 132 of an inverse shape of the curved surfaces 143b are arranged in the same lines as those of the curved surfaces 143b arranged on the other surface side of the master model 140. Also, on the transfer surface 131, the pin accommodation holes 133, which are formed through the transfer of the shape of end portions of the pins 146 arranged to project to the other surface side of the master model 140, are formed.

In the master model 140 as described above, the center axes of the curved surfaces 143a and 143b, which form a pair, coincide with each other at high precision over the whole master model 140. Accordingly, by accurately performing the mutual position determination of the upper mold 120 and the lower mold 130, the center axes of the lens forming surfaces 122 of the upper mold 120 and the lens forming surfaces 132 of the lower mold 130, which form a pair, coincide with each other at high precision over the whole master model 140. Also, by making end portions of the pins 146 accommodated in the pin accommodation holes 123 of the upper mold 120 and the corresponding pin accommodation holes 133 of the lower mold 130, respectively, the mutual position determination of the upper frame 120 and the lower frame 130 can be easily and accurately performed.

In this case, the manufacturing of the upper mold 120 and the lower frame mole 130 is not limited to the electro-plating method. For example, the molds may be manufactured by using glass or resin as the mold material and transferring shapes of one surface or the other surface of the master model 140 to the softened mold material.

Then, with reference to FIGS. 22A to 22D, a method of manufacturing a wafer-level lens array 10 using an upper mold frame 120 and a lower mold frame 130 will be described.

Figure 22A:
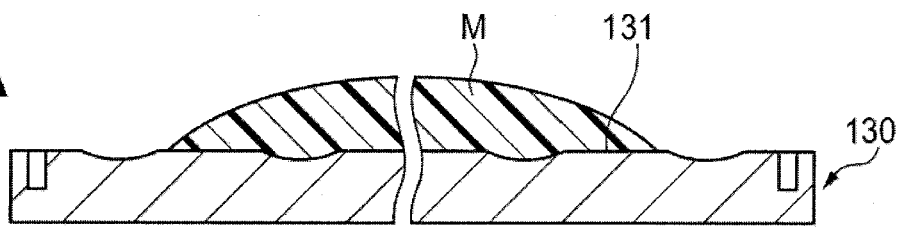
FIGS. 22A to 22D are views illustrating an example of a method of manufacturing a lens array using the mold of FIG. 20.
Figure 22B:
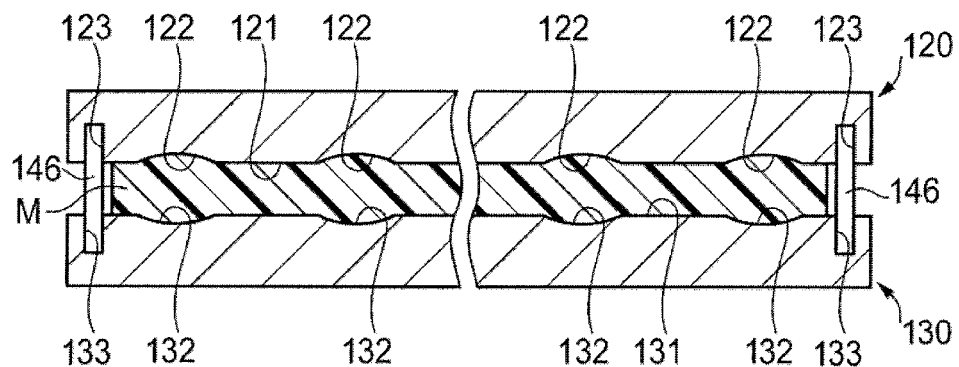
Figure 22C:
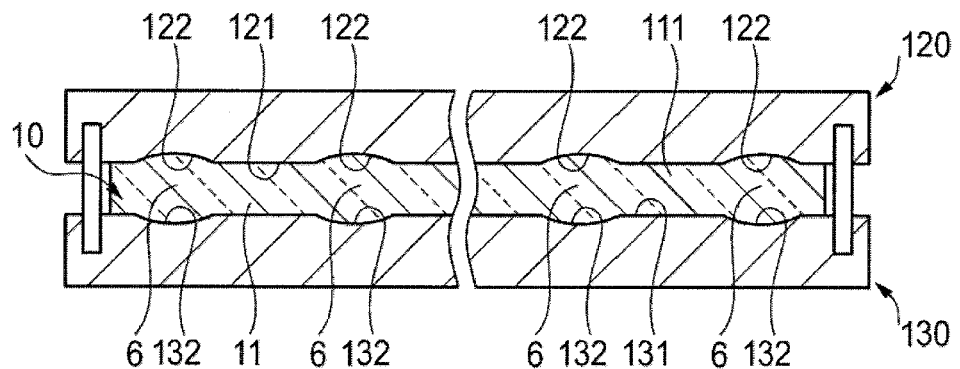

First, the molding material M is supplied onto the transfer surface 131 of the lower mold 130 (see FIG. 22A).

Then, the upper mold 120 is lowered, the molding material M is inserted between the transfer surface 121 of the upper mold 120 and the transfer surface 131 of the lower mold 130, and then the upper and lower molds 120 and 130 are compressed to transform the molding material M so that the molding material M is modeled on both the transfer surfaces 121 and 131. Here, by making the end portions of the pins 146 accommodated in the pin accommodation holes 123 of the upper mold 120 and the corresponding pin accommodation holes 133 of the lower mold 130, respectively, the mutual position determination of the upper frame 120 and the lower frame 130 is performed. Accordingly, the center axes of the lens forming surfaces 122 of the upper mold 120 and the lens forming surfaces 132 of the lower mold 130 coincide with each other at high precision (see FIG. 22B).

Then, after the upper mold 120 is lowered down to the end, the molding material M, which is positioned between the transfer surface 121 of the upper frame 120 and the transfer surface 131 of the lower mold 130, is cured by giving curing energy to the molding material M through heating or irradiation of active energy rays, resulting in that the wafer-level lens array 10 is obtained. Lens portions 6 are formed between the lens forming surfaces 122 of the upper mold 120 and the lens forming surfaces 132 of the lower mold 130, which form a pair. Also, the substrate portion 11 is formed between the transfer surfaces 121 of the upper mold 120 and the transfer surfaces 131 of the lower mold 130 except for the lens forming surfaces 122 and 132 (see FIG. 22C).

Figure 22D:
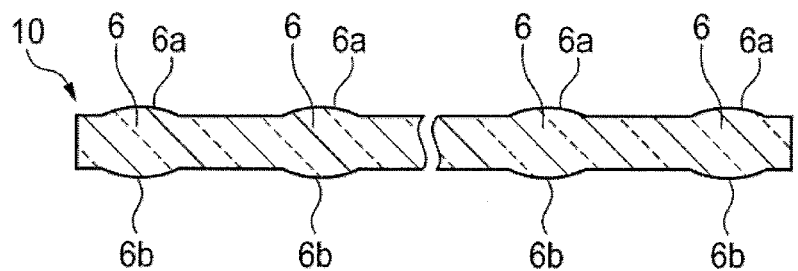

Then, the wafer-level lens array 10 is separated from the upper mold 120 and the lower mold 130 (see FIG. 22D).

By performing the mutual position determination of the upper mold 120 and the lower mold 130, the center axes of the lens forming surfaces 122 of the upper mold 120 and the lens forming surfaces 132 of the lower mold 130, which form a pair, coincide with each other at high precision over the whole master model 140, and also the optical axes of the lens surfaces 6a and 6b of one surface and the other surface of the lens portions 6, which are formed between the lens forming surfaces 122 and 132, that form a pair, coincide with each other at high precision over the whole master model 140.

Next, with reference to FIGS. 23A and 23B, a method of manufacturing the imaging unit will be described.

Figure 23A:
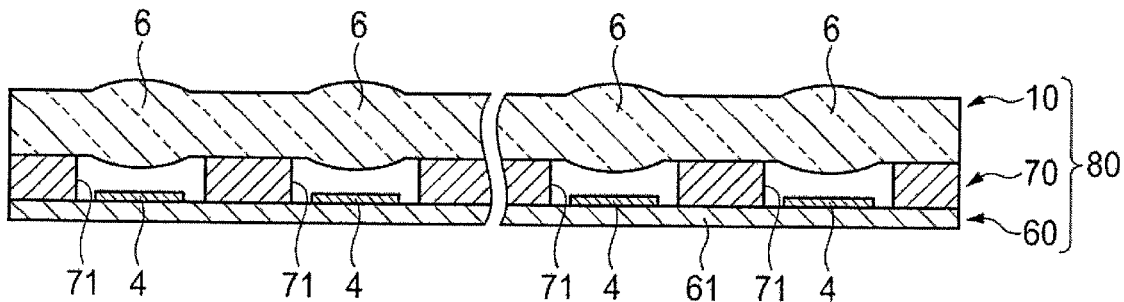
FIGS. 23A and 23B are views illustrating an example of a method of manufacturing the imaging unit of FIG. 1.
Figure 23B:
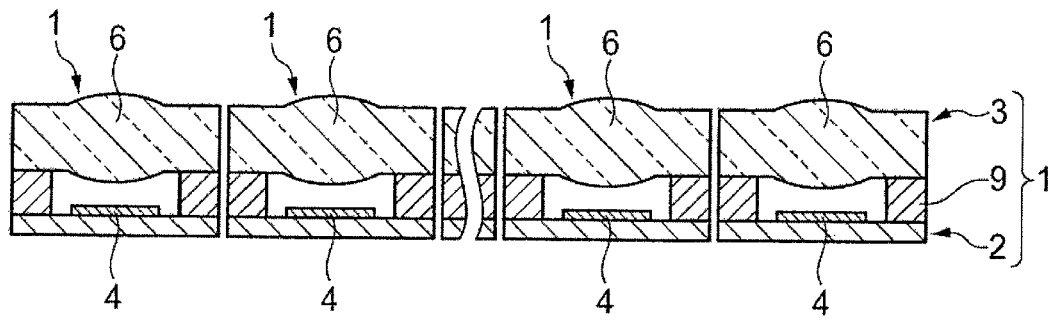

According to an example as illustrated in FIGS. 23A and 23B, a wafer-level lens array 10 is laminated on a sensor array 60 through the intervention of a spacer member 70 to form a body, and then the wafer-level lens array 10, the sensor array 60, and the spacer member 70 are cut together to obtain a plurality of imaging units 1 (see FIG. 1).

The sensor array 60 includes a wafer 61 formed of a semiconductor material such as silicon. The wafer 61 is formed with the same size as that of the wafer-level lens array 10. On the wafer 61, a plurality of solid-state imaging devices 4 is formed. The solid-state imaging devices 4 are arranged in a matrix shaped in the same lines as those of the plurality of lens portions 6 of the wafer-level lens array 10 on the wafer 61.

The spacer member 70 is a member that is in a wafer shape with the same size as that of the wafer-level lens array 10. On the spacer member 70, a plurality of through-holes 71 is formed. The through-holes 71 formed on the spacer member 70 are arranged in a matrix shape in the same lines as those of the plurality of lens portions 6 of the wafer-level lens array 10.

First, the spacer member 70 is placed on the surface of the sensor array 60, on which the plurality of sold-state imaging devices 4 is arranged, and both the spacer member 70 and the sensor array 60 are bonded together. Then, the wafer-level lens array 10 is placed on the spacer member 70, and the wafer-level lens array 10 and the spacer member 70 are bonded together. By the spacer member 70, there is a predetermined distance between the respective lens portions 6 of the wafer-level lens array 10 and the corresponding solid-state imaging devices 4 of the sensor array 60 (see FIG. 23A).

Then, a laminated body 80, in which the wafer-level lens array 10, the sensor array 60, and the spacer member 70 are united, is cut in a lattice shape. The wafer-level lens array 10 is divided into a plurality of lens modules 3 including the lens portions 6, respectively, and the sensor array 60 is divided into a plurality of sensor modules 2 including the imaging devices, respectively. Also, the spacer member 70 is divided into a plurality of spacers 9 which are interposed between the lens modules 3 and the corresponding sensor modules 2, respectively, to connect the lens modules 3 and the sensor modules 2, respectively. One set of a lens module 3, a sensor module 2, and a spacer 9, which are bonded in a body, constitutes one imaging unit 1 (see FIG. 23B).

In the illustrated example, one wafer-level lens array 10 is laminated on the sensor array 60. However, a plurality of wafer-level lens arrays 10 may be laminated. In this case, the respective wafer-level lens array 10 are sequentially laminated in a state where the spacer member 70 is interposed between the sensor array 60 and the wafer-level lens array 10, and another spacer member that is equal to the spacer member 70 is interposed between the wafer-level lens arrays 10 which are laminated on the sensor array 60. The shape of the lens portions 6 may differ for each wafer-level lens array 10.

Figure 24:
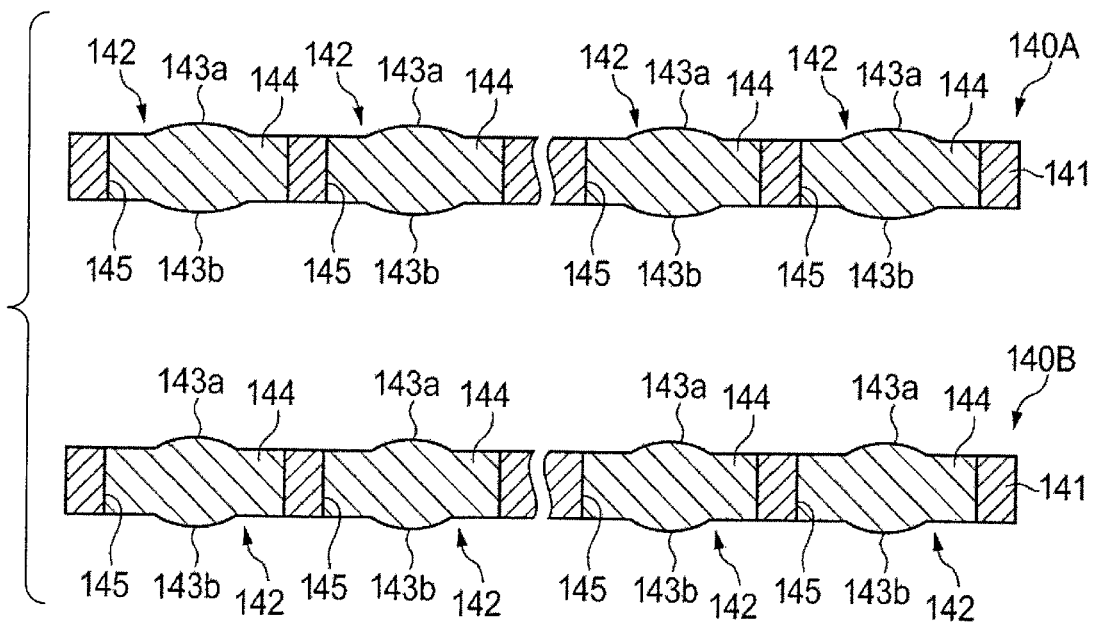
FIG. 24 is a view illustrating a modified example of the master model of FIG. 17.
Figure 25:
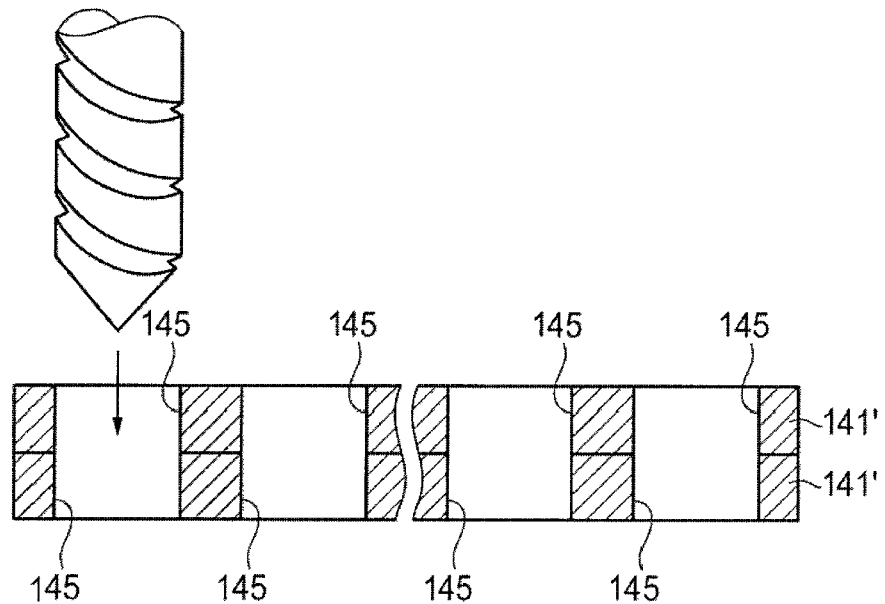
FIG. 25 is a view illustrating an example of a method of manufacturing the master model of FIG. 24.

Here, in the case where the plurality of wafer-level lens array 10 is laminated on the sensor array 60, it is necessary that the optical axes of the plurality of lens portions 6 that constitute one optical system, which are parallel to the lamination direction of the wafer-level lens arrays 10, coincide with each other at high precision. The coaxiality that is permitted with respect to the optical axes of the lens portions 6 of the wafer-level lens array 10 and the optical axes of the lens portions 6 of the other corresponding wafer-level lens array 10 depends upon the pitch accuracy of the arrangement of the lens portions 6 in the respective wafer-level lens arrays 10 and also depends upon the pitch accuracy of the arrangement of the members 142 corresponding to lenses in their master model 140. With reference to FIGS. 24 and 25, on the assumption that two wafer-level lens arrays 10 are laminated, master models of the lens arrays and their manufacturing method will be described.

As illustrated in FIG. 24, the master models 140A and 140B, which are master models of the laminated lens arrays, have the same construction as that of the above-described master model 140, and each of the master models includes a substrate 141 on which a plurality of through-holes 145 is arranged, and a plurality of members 142 corresponding to lenses inserted into the through-holes 145, respectively. However, in the members 142 corresponding to lenses included in the master model 140A and the members 142 corresponding to lenses included in the master model 140B, the shapes (diameters) of the curved surfaces 143a and 143b formed on one surface and the other surface thereof may differ. Accordingly, the wafer-level lens array 10 copied using the mold to which the shape of the master model 140A has been transferred and the wafer-level lens array 10 copied using the mold to which the shape of the master model 140B has been transferred have different shapes (diameters) of the lens portions 6.

As illustrated in FIG. 25, the substrate 141 included in the master model 140A and the substrate 141 included in the master model 140B are manufactured by laminating their substrate materials 141' and forming through-holes 145 on the two laminated substrate materials 141' through a collective boring process using a drill or end mill.

According to this, the pitches of the arrangements of the through-holes 145 in their substrates 141 are equal to each other in the master model 140A and the master model 14B, and thus the pitches of the arrangements of the members 142 corresponding to lenses inserted into the through-holes 145, respectively, are equal to each other in the master model 140A and the master model 140B. Accordingly, the pitches of the arrangements of the lens portions 6 in the wafer-level lens array 10 copied using the mold to which the shape of the master model 140A has been transferred and the pitches of the arrangements of the lens portions in the wafer-level lens array 10 copied using the mold to which the shape of the master model 140B has been transferred become equal to each other in the same manner. Accordingly, in the case where the wafer-level lens arrays 10 are laminated, the optical axes of the plurality of lens portions 6 that constitute one optical system, which are parallel to the lamination direction of the wafer-level lens arrays 10, coincide with each other at high precision.

In the illustrated example, in the members 142 corresponding to lenses included in the master model 140A and the members 142 corresponding to lenses included in the master model 140B, the diameters of the curved surfaces 143a and 143b formed on one surface and the other surface thereof are different from each other. The diameter of the through-holes 145 collectively formed on the substrate 141 included in the master model 140A and the substrate 141 included in the master model 140B is set to be larger than the diameter which is larger one between the diameter of the curved surfaces 143a and 143b of the members 142 corresponding to lenses included in the master model 140A and the diameter of the curved surfaces 143a and 143b of the members 142 corresponding to lenses included in the master model 140B. Also, the flange portions 144 are filled between the portions inserted in the curved surfaces 143a and 143b and inner peripheries of the through-holes 145, respectively. By doing this, even in the case of laminating wafer-level lenses having different diameters, collectively processed substrates can be used. Accordingly, the processing is facilitated, and the pitch between the laminated lenses can be kept at high precision.

Hereinafter, modified examples of the master model 140 will be described.

Figure 26:
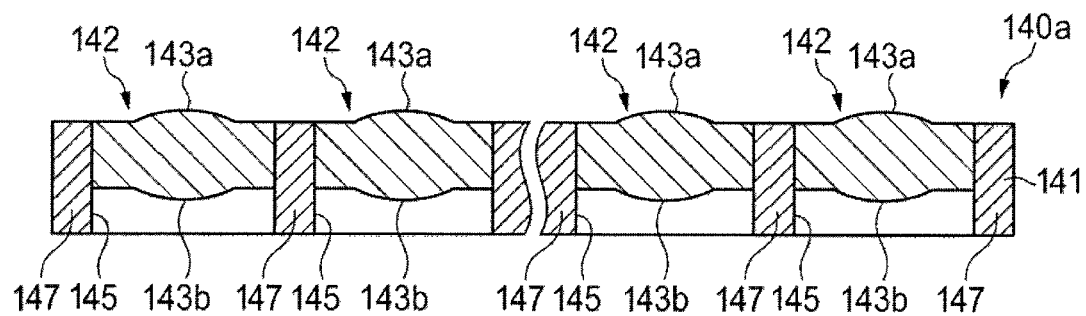
FIG. 26 is a view illustrating another modified example of the master model of FIG. 17.

A master model 140a as illustrated in FIG. 26 is a master model in the case where a spacer portion that corresponds to the spacer member 70 in the laminated body 80 is formed in a body with the wafer-level lens array 10. This master model 140 includes a substrate 141 and a plurality of members 142 corresponding to lenses.

The substrate 141 is in a wafer shape with the same size as that of the wafer-level lens array 10, and its thickness is the sum of thickness of the substrate portion 11 of the wafer-level lens array 10 and the thickness of the spacer member 70. In a state where the members 142 corresponding to lenses are inserted into the through-holes 145, respectively, the curved surfaces 143b of the other surface side of the members 142 corresponding to lenses are accommodated in the through-holes 145, respectively, the other surface side of the substrate 141 projects over the curved surfaces 143b of the other surface side of the members 142 corresponding to lenses to form the spacer portion 147. That is, the spacer portion 147 is formed by the thickness of the substrate 141.

On the other surface side of the wafer-level lens array 10 that is copied using the mold to which the shape of the master model 140 has been transferred, a spacer portion that corresponds to the spacer portion 147 of the master model 140 is formed in a body. In the case where the spacer portion is laminated on the sensor array 60 or another wafer-level lens array 10, the spacer portion is interposed between the sensor array 60 and another wafer-level lens array 10 so as to provide a predetermined distance between the respective lens portions 6 and the corresponding devices (the solid-state imaging devices 4 of the sensor array 60 or the lens portions 6 of another wafer-level lens array 10).

Figure 27:
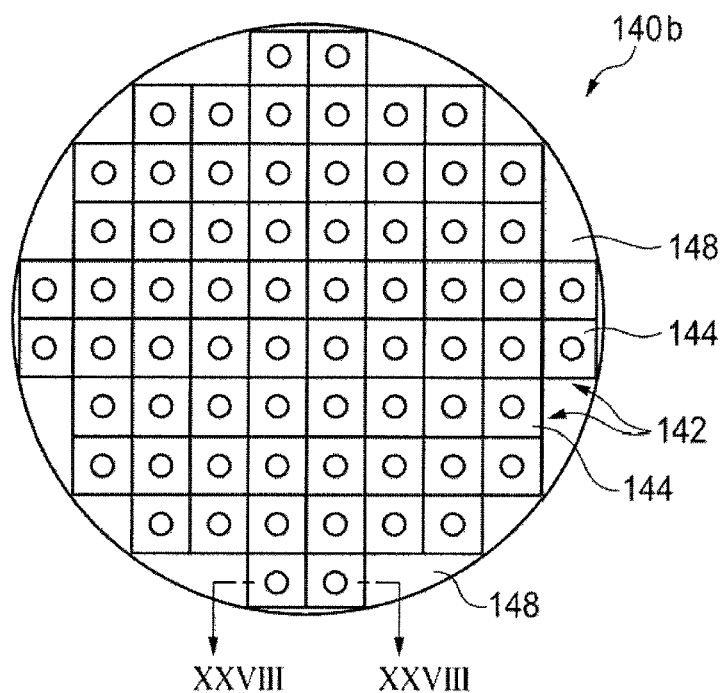
FIG. 27 is a view illustrating still another modified example of the master model of FIG. 17.
Figure 28:
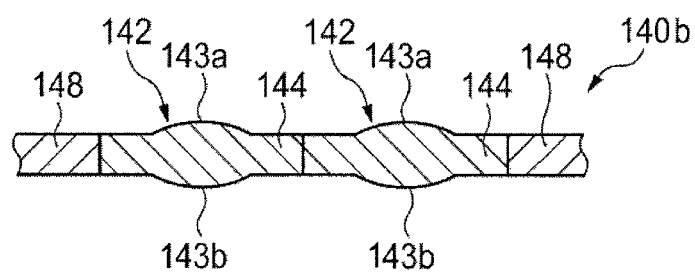
FIG. 28 is a view illustrating the master model taken along line XXVIII-XXVIII of FIG. 27.

The master model 140b as illustrated in FIGS. 27 and 28 includes a plurality of members 142 corresponding to lenses arranged in the same lines as those of the plurality of lens portions 6 of the wafer-level lens array 10.

The curved surfaces 143a and 143b are formed on one surface and the other surface of the members 142 corresponding to lenses, and the members 142 corresponding to lenses have flange portions 144 that surround the circumference of the portions inserted in the curved surfaces 143a and 143b. When the members 142 corresponding to lenses are arranged, the flange portions 144 are formed to be filled between the neighboring members 142 corresponding to lenses, and in the illustrated example, they are in the shape of tetragons as seen in the plan view. The members 142 corresponding to lenses are bonded with the flange portions 144 of the members 142 corresponding to lenses neighboring the flange portions 144 thereof.

Next, a method of manufacturing the master model 140b will be described.

Figure 29A:
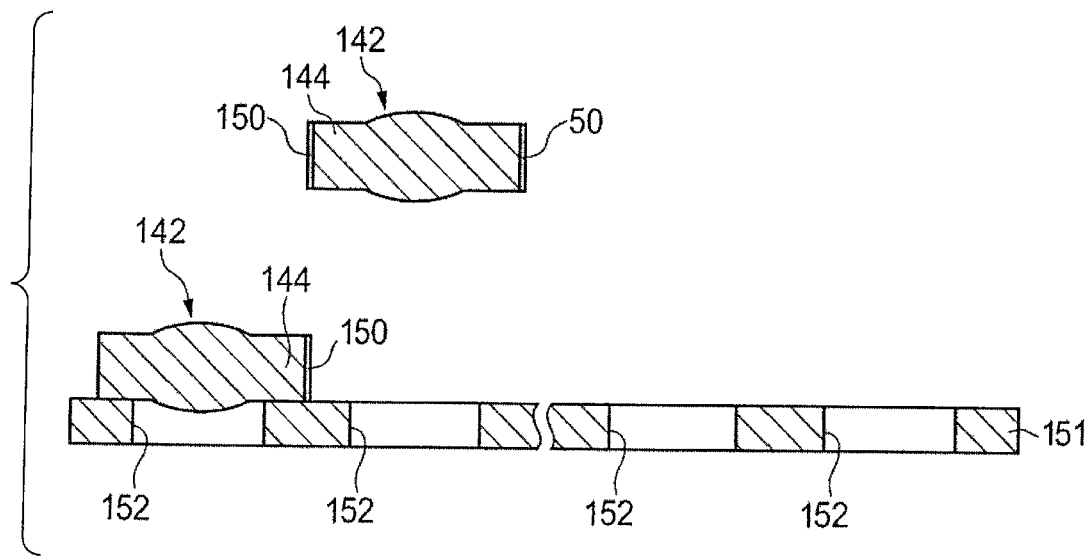
FIGS. 29A and 29B are views illustrating an example of a method of manufacturing the master model of FIG. 27.

First, a plurality of members 142 corresponding to lenses is preproduced, and adhesives 150 such as photocurable resin thermosetting resin are spread on side surfaces of the flange portions 144. Then, one member 142 corresponding to a lens is arranged on the fixture 151, and based on this, other members 142 corresponding to lenses are arranged to neighbor the member 142 corresponding to a lens already arranged on the fixture 151. In this case, by contacting the side surfaces of the flange portions 144, the positions of the members 142 corresponding to lenses placed on the fixture 151 are determined (see FIG. 29A).

Figure 29B:
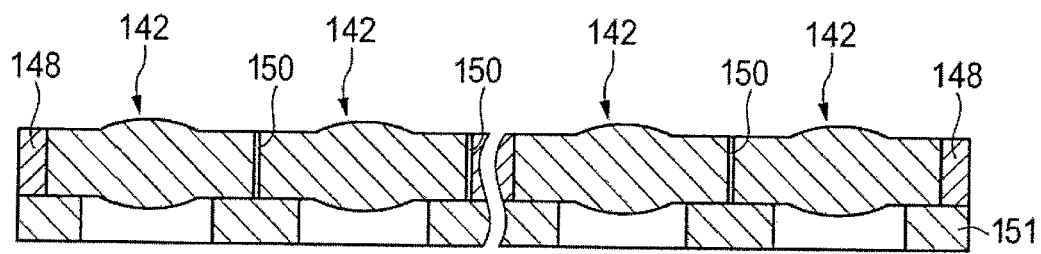

By repeating the above-described processes, the members 142 corresponding to lenses, the number of which is equal to the number of lens portions 6 of the wafer-level lens array 10, are arranged in the same lines as those of the lens portions 6 on the fixture 151. Then, in the case where UV curing resin is used as the adhesives 150, the members 42 corresponding to lenses are irradiated with UV rays, while in the case where thermosetting resin is used as the adhesives 150, the adhesives 150 are heated and then is cured to combine and connect the neighboring members 142 corresponding to lenses to their flange portions 144. Also, putties 148 are filled up on the fixture 151 to surround the circumference of the plurality of members 142 corresponding to lenses in a body, so that the whole wafer is formed (see FIG. 29B).

Figure 30:
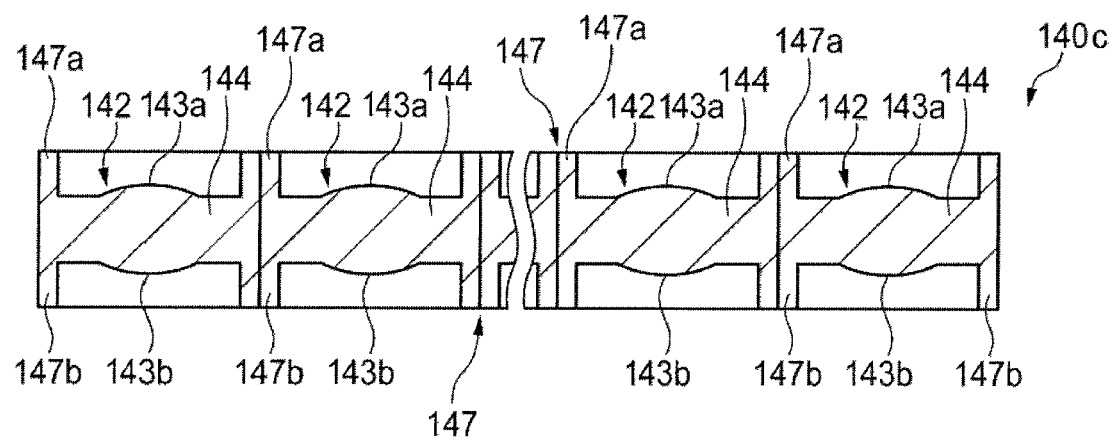
FIG. 30 is a view illustrating still another modified example of the master model of FIG. 17.

The master model 140c as illustrated in FIG. 30 includes spacer portions 147 formed on one surface and the other surface thereof. On the flange portions 144 of the members 142 corresponding to lenses, frame portions 147a and 147b are installed along the edges of one surface and the other surface thereof. The frame portions 147a surrounds the curved surfaces 143a on the surface side of the members 142 corresponding to lenses, and projects over the curved surfaces 143a. Also, the frame portions 147b surrounds the curved surfaces 143b on the other surface side of the members 142 corresponding to lenses, and projects over the curved surfaces 143b.

The frame portions 147a and 147b on one surface and the other surface of the members 142 corresponding to lenses are bonded to the frame portions 147a and 147b on one surface and the other surface of the neighboring members 142 corresponding to lenses, respectively. The frame portions 147a on the surface side of the members 142 corresponding to lenses are integrated to form a spacer portion 147 on the surface side of the master model 140c, and the frame portions 147b on the other surface side of the members 142 corresponding to lenses are integrated to form a spacer portion 147 on the other surface side of the master model 140c.

On one surface and the other surface of the wafer-level lens array 10 that is copied using the mold to which the shape of the master model 140c has been transferred, spacer portions that correspond to the spacer portions 147 of one surface and the other surface of the master model 140c are formed in a body. By the spacer member 70, there is a predetermined distance between the respective lens portions 6 and the corresponding devices (solid-state imaging devices 4 of the sensor array 60 or the lens portions 6 of another wafer-level lens array 10).

Next, another example of the mold of the lens array manufactured using the master model 140 and the manufacturing method thereof will be described.

Figure 31:
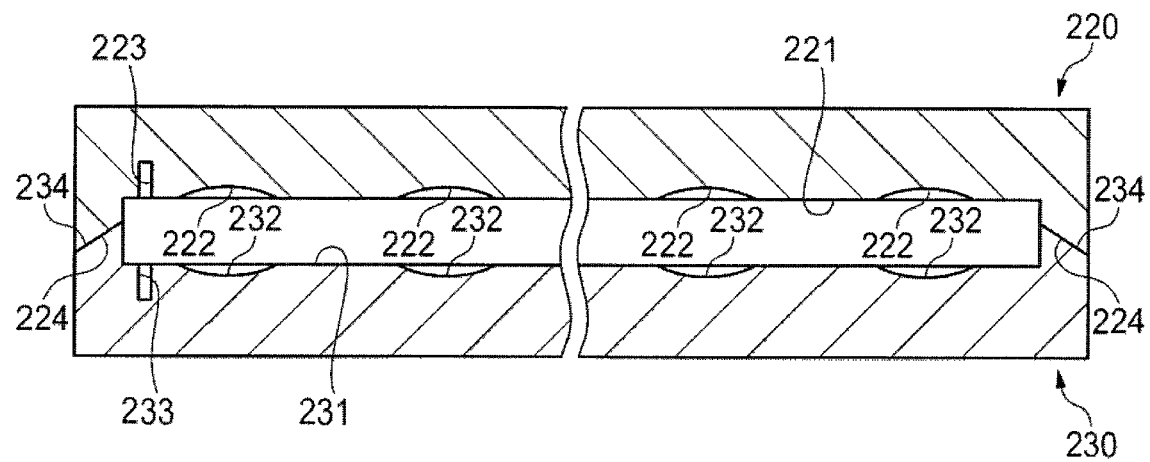
FIG. 31 is a view illustrating another example of a mold according to an embodiment of the invention.

The mold as illustrated in FIG. 31 includes an upper mold 220 and a lower mold 230.

The upper mold 220 has a transfer surface 221. The transfer surface 221 is formed by transferring the surface shape of the master model 140 thereto, and a plurality of lens forming surfaces 222 is formed in a matrix shape in the same lines as those of the curved surfaces 143a arranged on the surface side of the master model 140.

The lower mold 230 has a transfer surface 231. The transfer surface 231 is formed by transferring the other surface shape of the master model 140 thereto, and a plurality of lens forming surfaces 232 is formed in a matrix shape in the same lines as those of the curved surfaces 143b arranged on the other surface side of the master model 140.

As position determination portions that determine the mutual positions of the upper mold 220 and the lower mold 230, tapered surfaces 224 and 234 that match each other are installed along their outer peripheries. Also, in order to restrict the relative rotation about the center axes thereof, pairs of pin accommodation holes 223 and 233 are formed in positions apart from the center axes on the upper mold 220 and the lower mold 230.

Figure 32A:
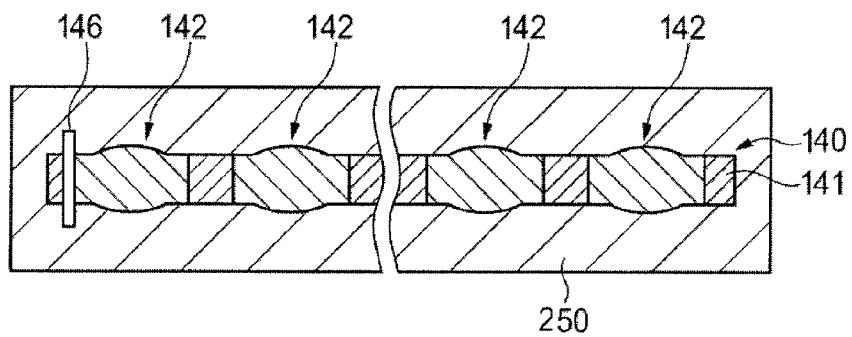
FIGS. 32A to 32C are views illustrating an example of a method of manufacturing the mold of FIG. 31.
Figure 32B:
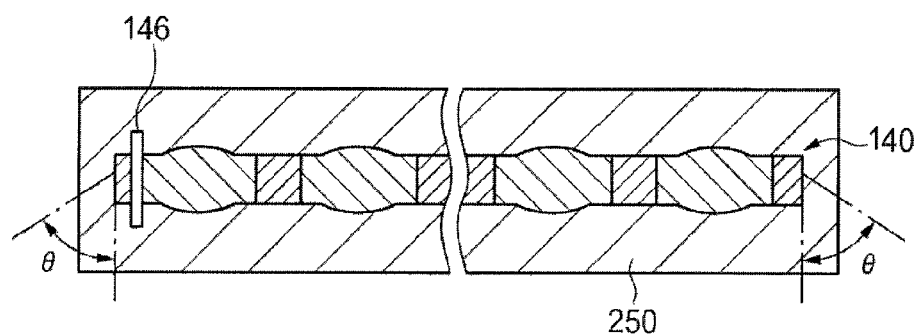
Figure 32C:
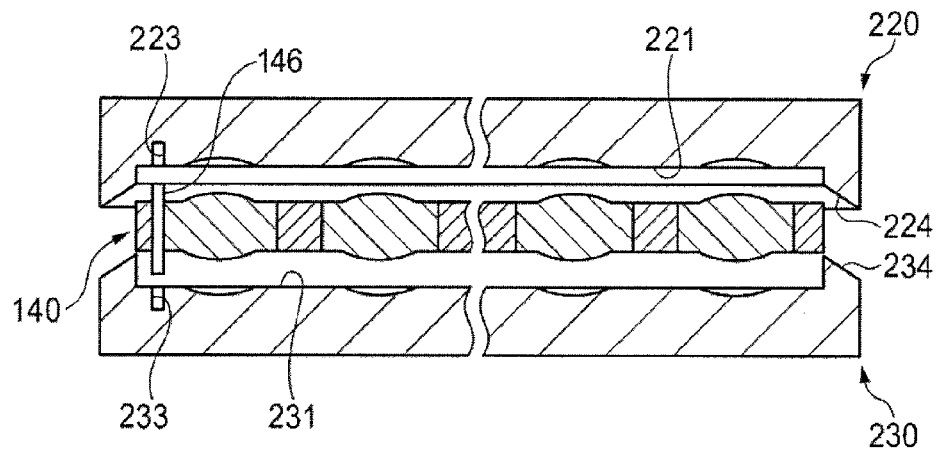

As illustrated in FIGS. 32A to 32C, a pin 146 is vertically installed in a position that is apart from the center axes of the master model 140, and a conductive layer is formed on the whole surface of the master model 140 including the pin 146. Then, nickel (Ni) is extracted and accumulated on the whole surface of the master model 140 by an electro-plating method. Accordingly, Ni accumulation 250 is accumulated on the master model 140 (see FIG. 32A).

Then, the accumulation 250 is divided into two in its thickness direction by incising the circumference of the accumulation 250 from the circumference of the accumulation at a depth reaching the outer periphery of the master model 140 and at a predetermined angle θ (<90°) about the outer periphery of the master model 140 (in other words, about the center axis of the master model 140) (see FIG. 32B).

One of the divided accumulations 250 includes the transfer surface 221 that is formed by transferring the surface shape of the master model 140 thereto, and this becomes the upper mold 220. Also, the other of the divided accumulations 250 includes the transfer surface 231 that is formed by transferring the other surface shape of the master model 140 thereto, and this becomes the lower mold 230. Also, the cut surface remaining on the upper mold 220 forms a tapered surface 224, and the cut surface remaining on the lower mold 230 forms a tapered surface 234 (see FIG. 32C).

In the master model 140 as described above, the center axes of the curved surfaces 143a and 143b, which form a pair, coincide with each other at high precision over the whole master model 140. Accordingly, by accurately performing the mutual position determination of the upper mold 220 and the lower mold 230, the center axes of the lens forming surfaces 222 of the upper mold 220 and the lens forming surfaces 232 of the lower mold 230, which form a pair, coincide with each other at high precision over the whole master model 140. Also, by matching the tapered surface 224 of the upper mold 220 and the tapered surface 234 of the lower mold 230, the mutual position determination of the upper frame 220 and the lower frame 230 can be easily and accurately performed.

As described above, in the description of the invention, as a master model that is an original of a mold for molding a lens array on which a plurality of lens portions is arranged, a plurality of members corresponding to lenses having curved surfaces molded in the same shape as that of lens surfaces of the lens portions is arranged in the same order as those of the plurality of lens portions in the lens array and is connected in a body.

Also, according to the master model disclosed in the description of the invention, the lens portions of the lens array have lens surfaces having power on one surface and the other surface thereof, and the respective members corresponding to lenses have curved surfaces molded in the same shape as that of lens surfaces on one surface and the other surface thereof.

Also, in the description of the invention, a method of manufacturing a master model that is an original of a mold for molding a lens array on which a plurality of lens portions is arranged is disclosed, which includes the steps of forming a plurality of members corresponding to lenses having curved surfaces molded in the same shape as lens surfaces of the lens portions, arranging one or more of the plurality of members corresponding to the lenses in the same order as the plurality of lens portions in the lens array, and integrally connecting the plurality of arranged members corresponding to the lenses.

Also, according to the method of manufacturing a master model in the description of the invention, the lens portions of the lens array have lens surfaces having power on one surface and the other surface thereof, and the respective members corresponding to lenses have curved surfaces molded in the same shape as that of lens surfaces on one surface and the other surface thereof.

Also, according to the method of manufacturing a master model in the description of the invention, the plurality of members corresponding to lenses includes flange portions that are filled between the neighboring members corresponding to lenses when the members are arranged, and the plurality of members corresponding to lenses is arranged so that their flange portions contact each other.

Also, according to the method of manufacturing a master model in the description of the invention, the plurality of members corresponding to lenses is arranged on the substrate.

Also, according to the method of manufacturing a master model in the description of the invention, the neighboring members corresponding to lenses are pre-connected when the members are arranged.

Also, in the description of the invention, a mold of a lens array in which a plurality of lens portions are arranged is disclosed, which is formed by transferring the shape of the master model to a mold material.

Also, in the description of the invention, a mold of a lens array, in which a plurality of lens portions are arranged, is disclosed, which includes an upper mold formed by transferring one surface shape of the master model to a first mold material, and a lower mold formed by transferring the other surface shape of the master model to a second mold material, wherein a position determination portion for performing a mutual position determination is installed on the upper mold and the lower mold.

Also, in the description of the invention, a method of manufacturing a mold of a lens array, in which a plurality of lens portions are arranged, is disclosed, which includes the steps of installing a plurality of convex on one surface of a master model and installing convex portions in positions of the other surface of the master model, which correspond to the plurality of convex portions of the surface, and forming an upper mold by transferring one surface shape of the master model to a mold material and forming a lower mold by transferring the other surface shape of the master model to a mold material.

Also, in the description of the invention, a method of manufacturing a mold of a lens array, in which a plurality of lens portions are arranged, is disclosed, which includes the steps of surrounding a master model with a mold material and transferring one surface shape and the other surface shape of the master model to the mold material, and dividing the mold material into an upper mold to which one surface shape of the master model is transferred and a lower mold to which the other surface shape of the master model is transferred by cutting the mold material.

Also, in the description of the invention, a lens array made by forming a lens material using the mold for the lens array is disclosed.

Also, in the description of the invention, a lens module that is separated from the lens array to include one lens portion is disclosed.

Also, in the description of the invention, an imaging unit including a sensor module including solid-state imaging devices and at least one lens module that forms an image on the solid-state imaging devices, wherein the lens module is the above-described lens module.

What is claimed is:

1. A method of manufacturing a master model that is an original of a mold for molding a lens array on which a plurality of lens portions is arranged, the method comprising:
    forming a plurality of members corresponding to lenses having curved surfaces molded in the same shape as lens surfaces of the lens portions;
    arranging one or more of the plurality of members corresponding to the lenses in the same order as the plurality of lens portions in the lens array; and
    integrally connecting the plurality of arranged members corresponding to the lenses, wherein the members corresponding to lenses include flange portions that are filled between the neighboring members corresponding to lenses when the members are arranged; and the plurality of members corresponding to lenses is arranged so that their flange portions contact each other.

2. The method according to claim 1, wherein the lens portions of the lens array have lens surfaces having power on one surface and the other surface thereof, and the respective members corresponding to lenses have curved surfaces molded in the same shape as that of lens surfaces of one surface and the other surface of the lens portion, on one surface and the other surface thereof.

3. The method according to claim 1, wherein the plurality of members corresponding to lenses is arranged on the substrate.

4. The method according to claim 1, wherein the plurality of neighboring members corresponding to lenses are pre-connected when the members are arranged.

5. The method according to claim 1, wherein an upper mold is formed by transferring one surface shape of the master model to a first mold material, and a lower mold formed by transferring the other surface shape of the master model to a second mold material;

wherein a position determination portion for performing a mutual position determination is installed on the upper mold and the lower mold.

6. A method of manufacturing a mold of a lens array, in which a plurality of lens portions is arranged, the method comprising:

surrounding a master model that is an original of a mold for molding a lens array on which a plurality of lens portions is arranged, wherein a plurality of members corresponding to lenses having curved surfaces molded in the same shape as lens surfaces of the lens portions is arranged in the same order as the plurality of lens portions in the lens array and is connected in a body, wherein the lens portions of the lens array have lens surfaces having power on one surface and the other surface thereof, and the respective members corresponding to lenses have curved surfaces molded in the same shape as that of lens surfaces of one surface and the other surface of the lens portion, on one surface and the other surface thereof, with a mold material and transferring one surface shape and the other surface shape of the master model to the mold material; and dividing the mold material into an upper mold to which one surface shape of the master model is transferred and a lower mold to which the other surface shape of the master model is transferred by cutting the mold material.

7. The method according to claim 6, wherein said mold of a lens array is formed by transferring the shape of the master model to a mold material.

8. A lens array made by forming a lens material using the mold for the lens array according to claim 7 or claim 5.

9. A lens module that is separated to include one lens portion from the lens array according to claim 8.

10. An imaging unit comprising a sensor module including solid-state imaging devices, and at least one lens module that forms an image on the solid-state imaging devices;

wherein the lens module is a lens module according to claim 9.

* * * * *